United States Patent

[11] 3,563,161

[72] Inventor Samuel A. Mencacci
   Wilrijk, Belgium
[21] Appl. No. 823,212
[22] Filed Feb. 3, 1969
   Division of Ser. No. 658,105, Aug. 3, 1967,
   Patent No. 3,495,523.
[45] Patented Feb. 16, 1971
[73] Assignee International Machinery Corporation S.A.
   St. Niklaas-Waas, Belgium

[54] ROTARY PRESSURE COOKER
   10 Claims, 26 Drawing Figs.
[52] U.S. Cl. .................................................. 99/366,
   99/214, 99/368, 99/370, 99/371
[51] Int. Cl. .................................................. A23l 3/02
[50] Field of Search .......................................... 99/214,
   360—371

[56] References Cited
   UNITED STATES PATENTS

| | | | |
|---|---|---|---|
| 865,645 | 9/1907 | Jennings | 99/364 |
| 1,154,611 | 9/1915 | Burpee | 99/365X |
| 1,301,428 | 4/1919 | Gitterman | 99/361X |
| 1,437,882 | 12/1922 | Barrows | 99/364X |
| 1,445,196 | 2/1923 | Berry | 99/363 |
| 1,457,852 | 6/1923 | Northrup et al. | 99/363 |
| 1,484,259 | 2/1924 | Fowle et al. | 99/360X |
| 1,485,851 | 3/1924 | Hopper | 99/360 |
| 1,826,036 | 10/1931 | Yarrow | 99/366 |
| 1,836,801 | 12/1931 | Johnson | 99/363X |
| 1,836,802 | 12/1931 | Johnson | 99/363X |
| 1,836,803 | 12/1931 | Johnson | 99/361 |
| 1,859,389 | 5/1932 | Graham | 99/361 |
| 1,883,606 | 10/1932 | Deback et al. | 99/361 |
| 2,262,921 | 11/1941 | Carvallo | 99/361 |
| 2,349,566 | 5/1944 | Thompson | 99/367 |
| 2,585,213 | 2/1952 | Baker | 99/364 |
| 2,695,556 | 11/1954 | Novotny | 99/365 |
| 2,782,708 | 2/1957 | Novotny | 99/365 |
| 2,817,593 | 12/1957 | Peebles | 99/371X |
| 2,833,202 | 5/1958 | Wilbur | 99/367 |

Primary Examiner—Billy J. Wilhite
Attorneys—F. W. Anderson and C. E. Tripp

ABSTRACT: A high capacity, low speed rotary cooking and cooling apparatus for handling cooker length rows of containers within a series of annular processing housings interconnected by star wheel transfer turrets. A reel in each housing arranged to move each container around an arcuate path, and at least one of said annular housings being of sufficient size to encompass another housing. The apparatus may include pressure feed and discharge valves capable of handling an entire row of containers at one time; or may include shorter pressure feed and discharge valves which handles shorter rows that are less than an entire cooker length row at one time and which are associated with an intermittently driven conveyor that accumulates the short rows and forms them into cooker length rows which are then deflected between the transfer conveyor and the adjacent housing. A modified apparatus includes one or more cylindrical housings with an inner drum that may be driven at a speed different from that of the reel so as to agitate the cooker length rows of containers.

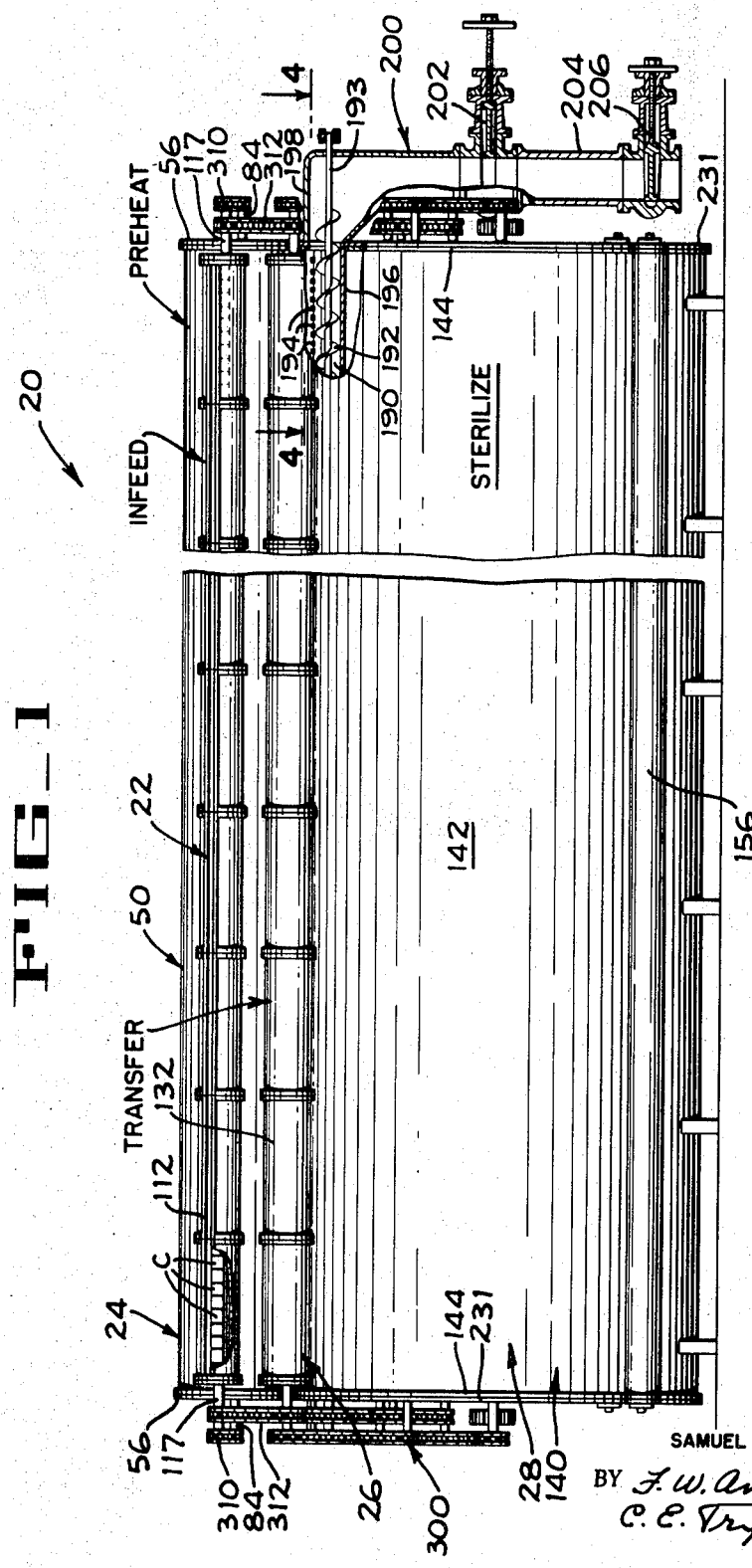

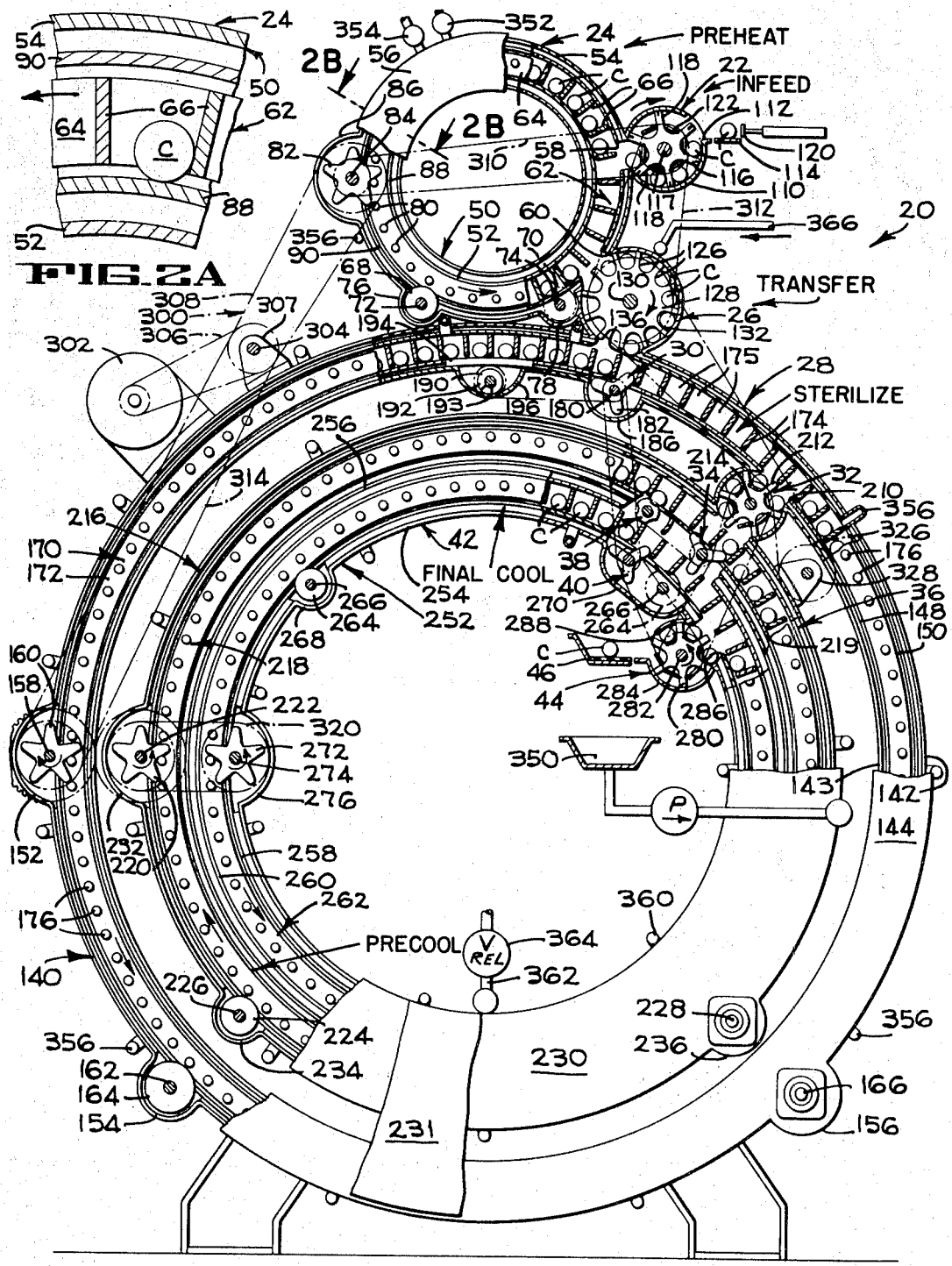

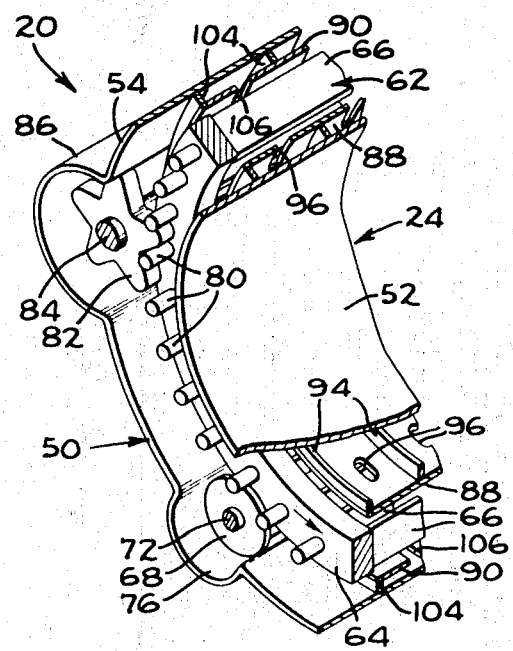
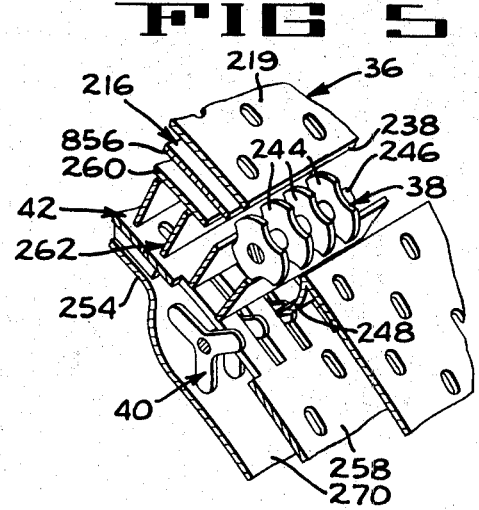
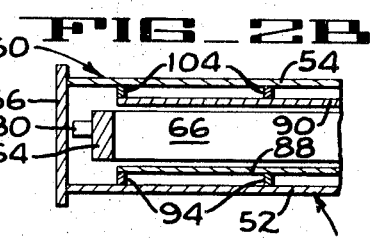
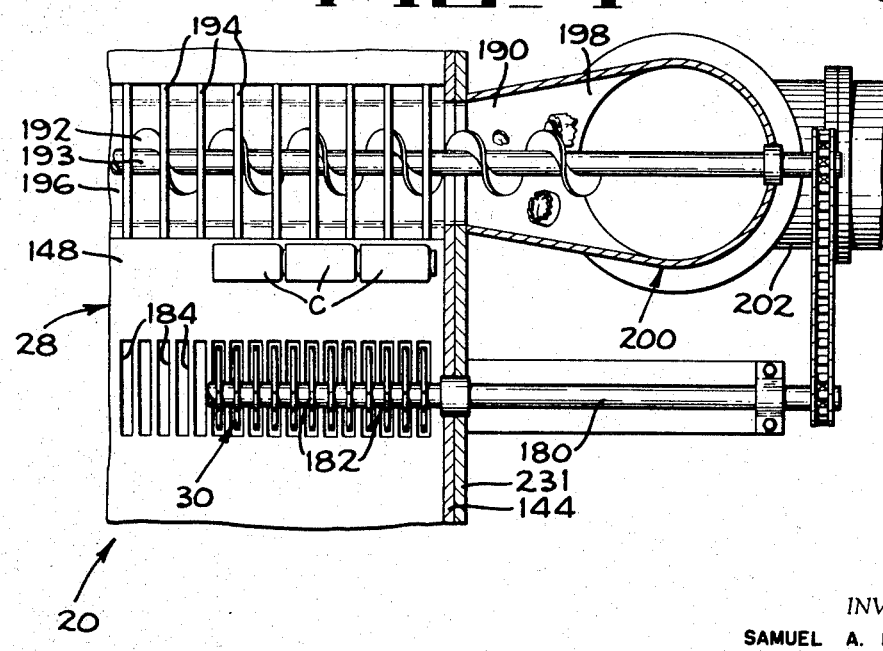

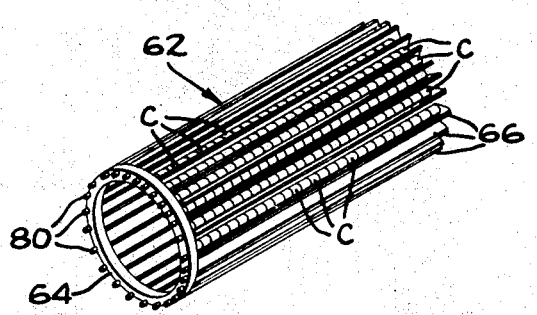
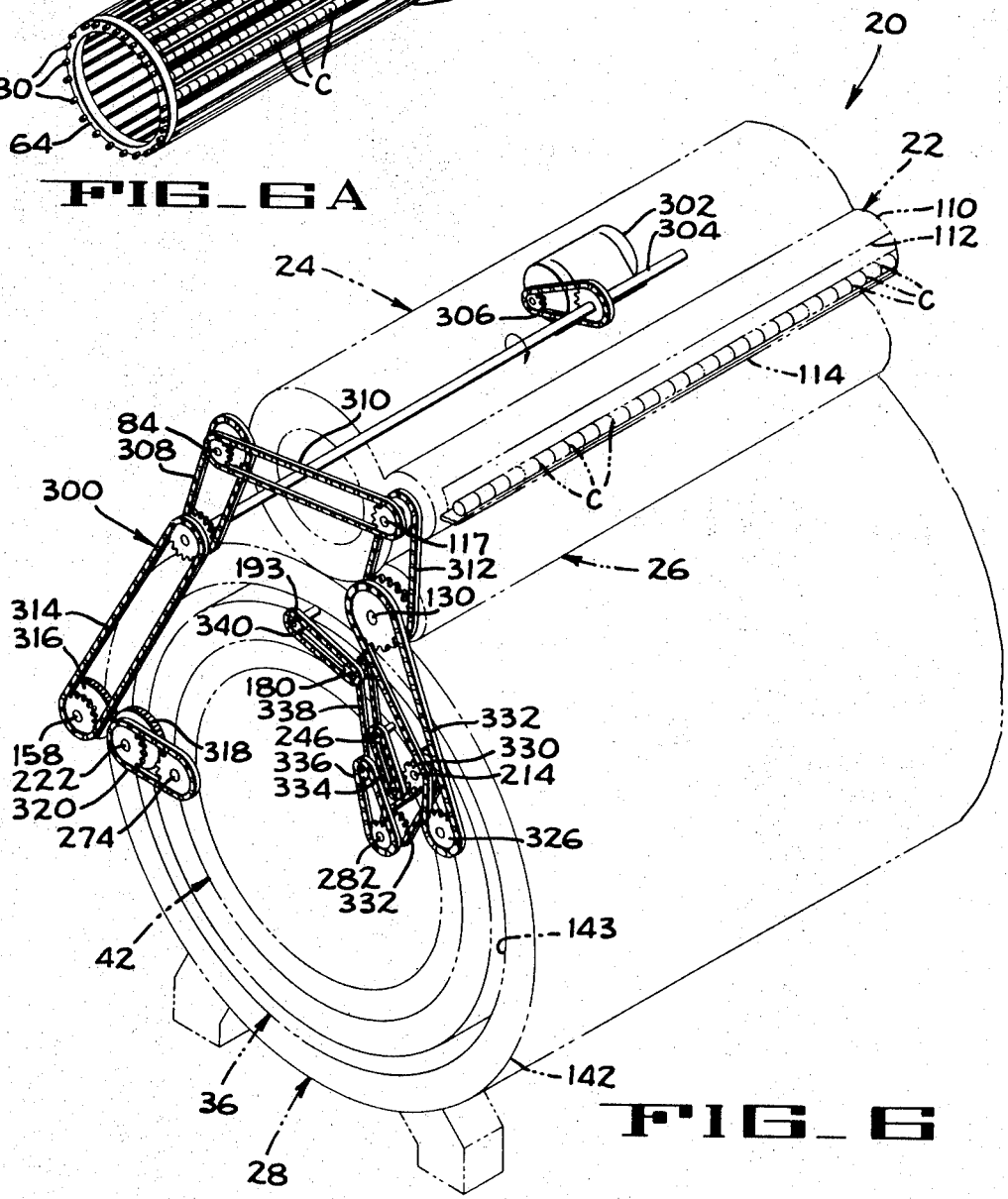

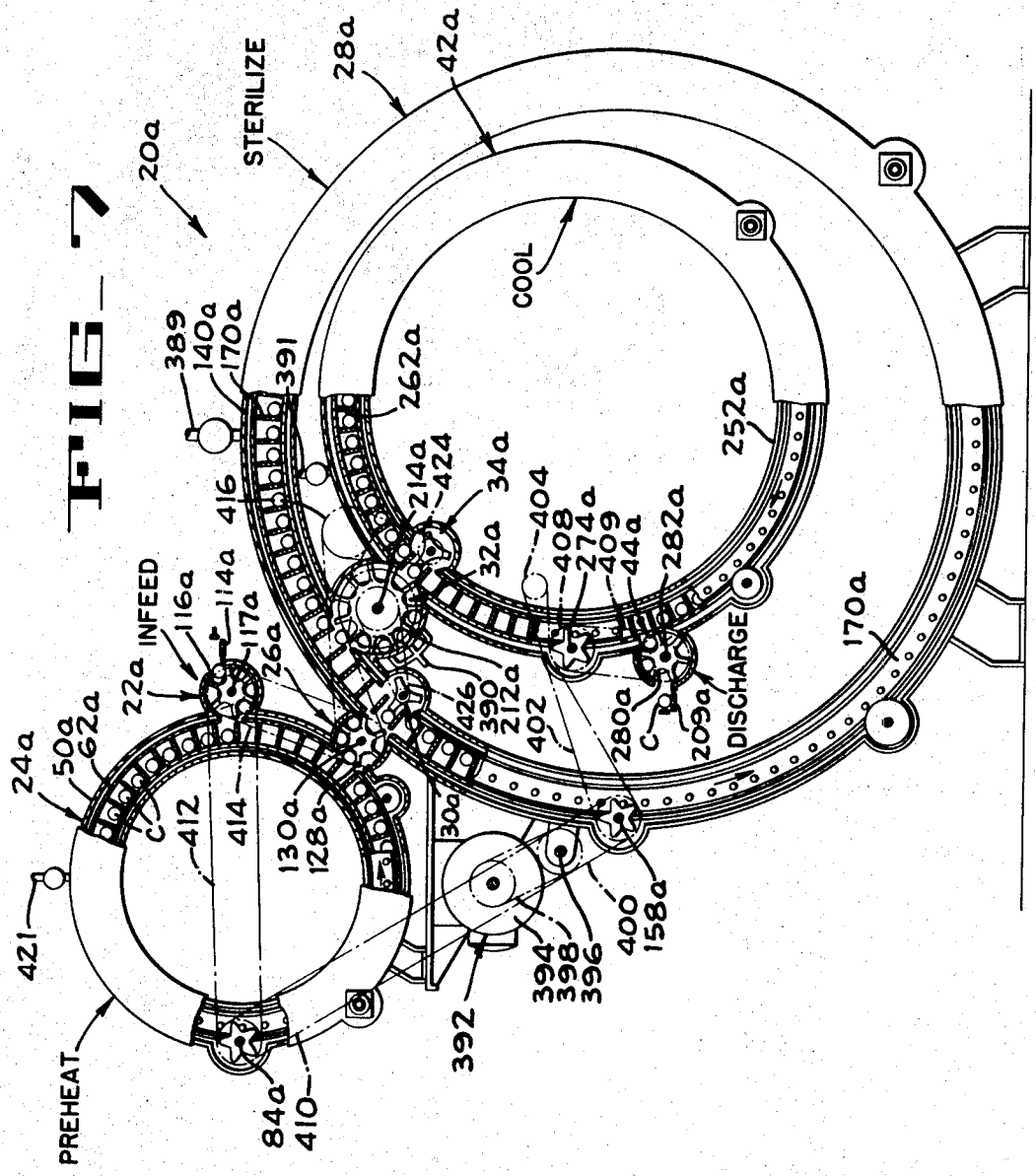

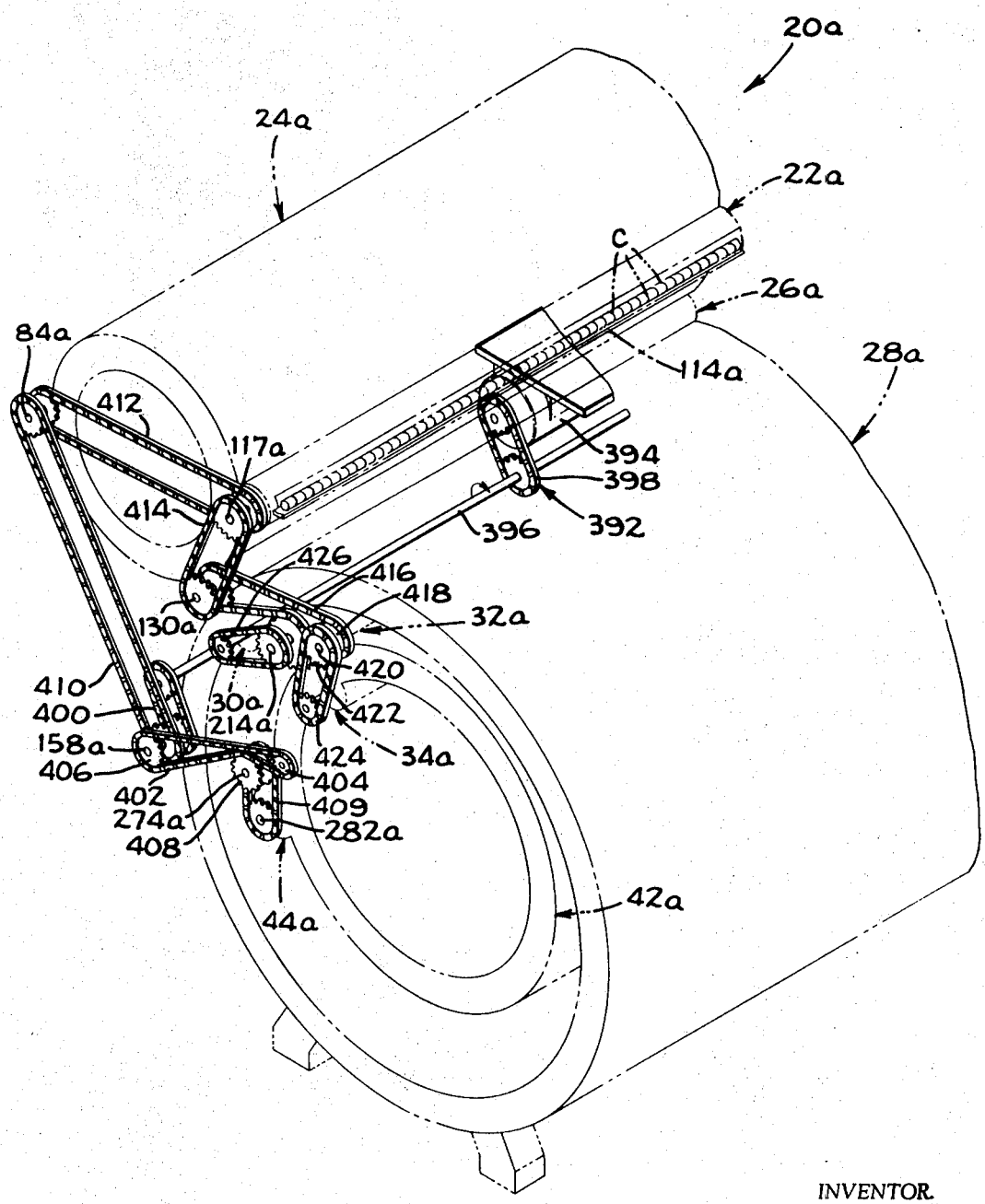

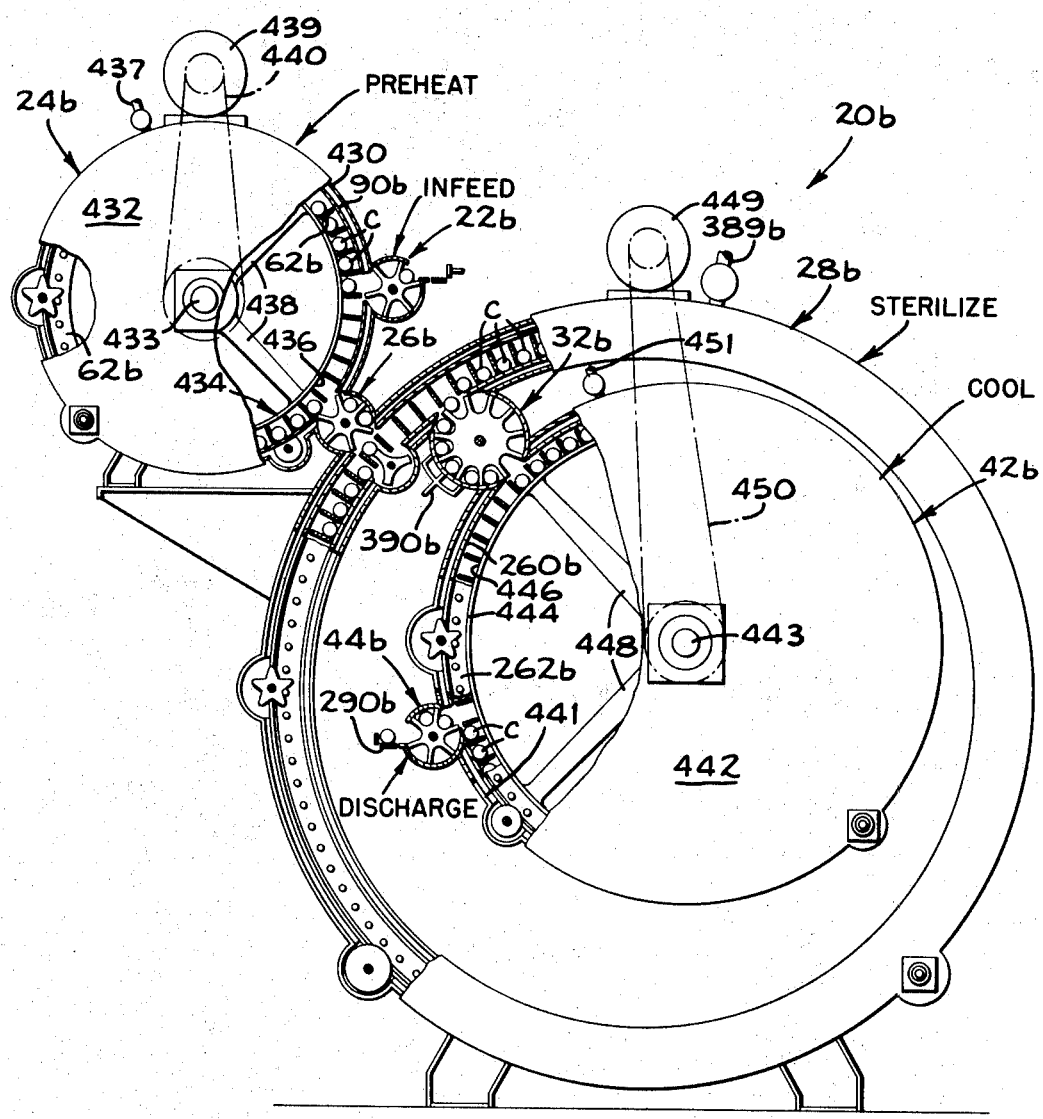
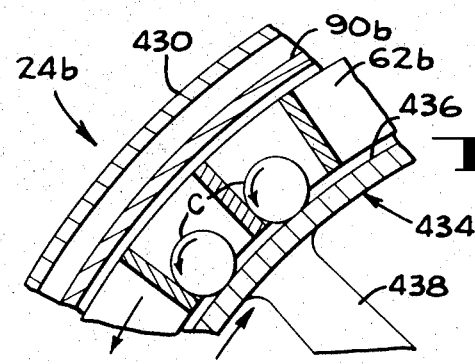

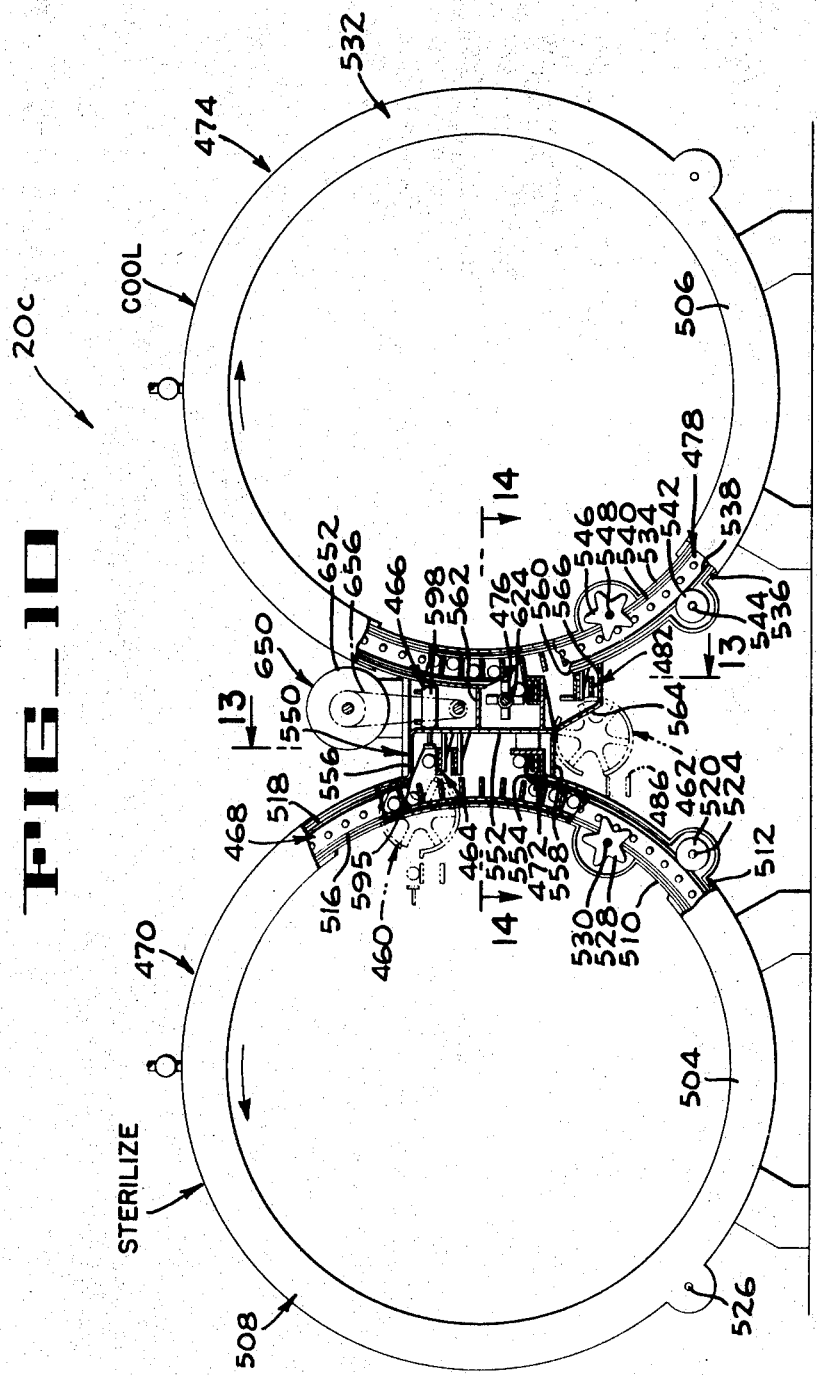

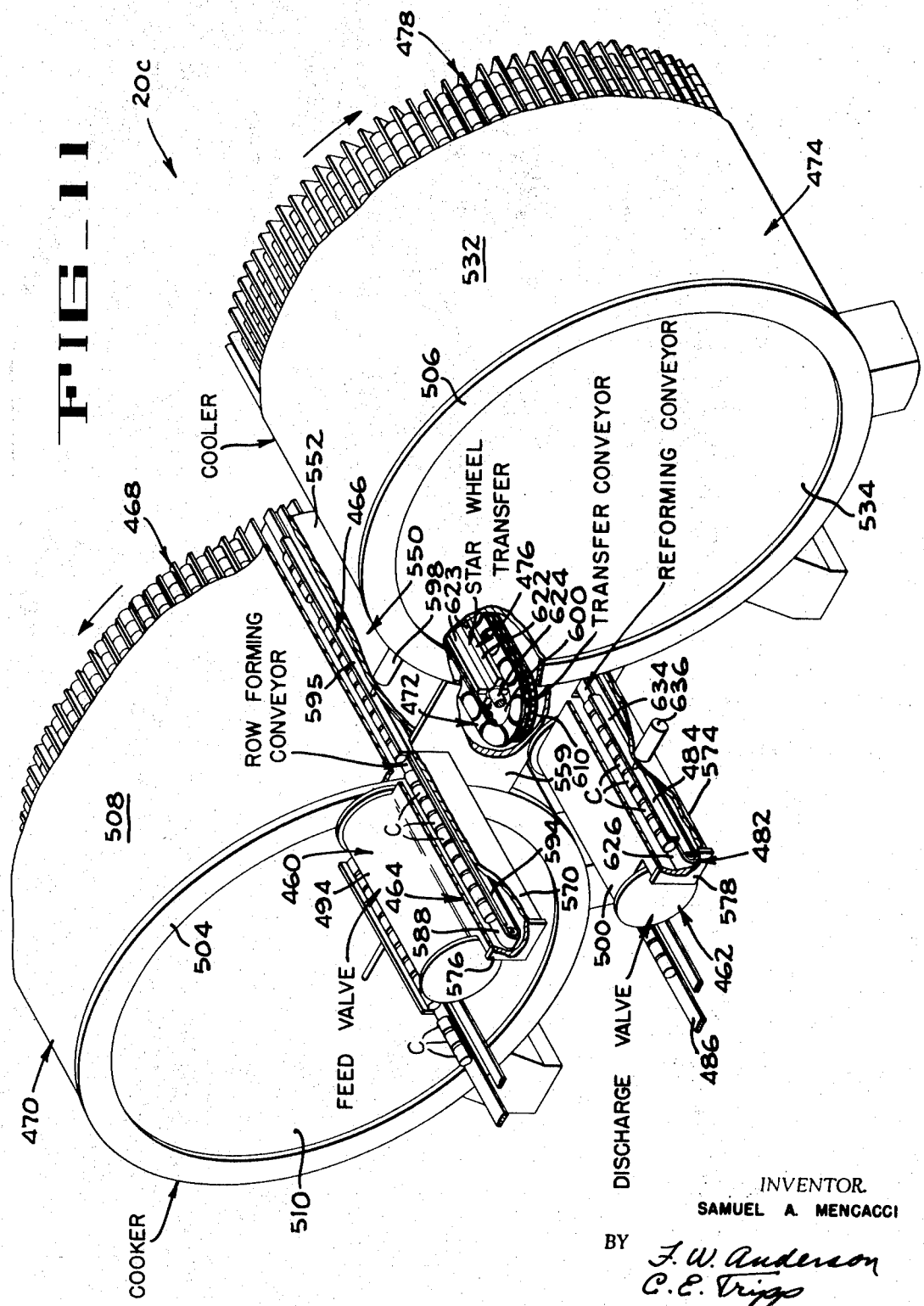

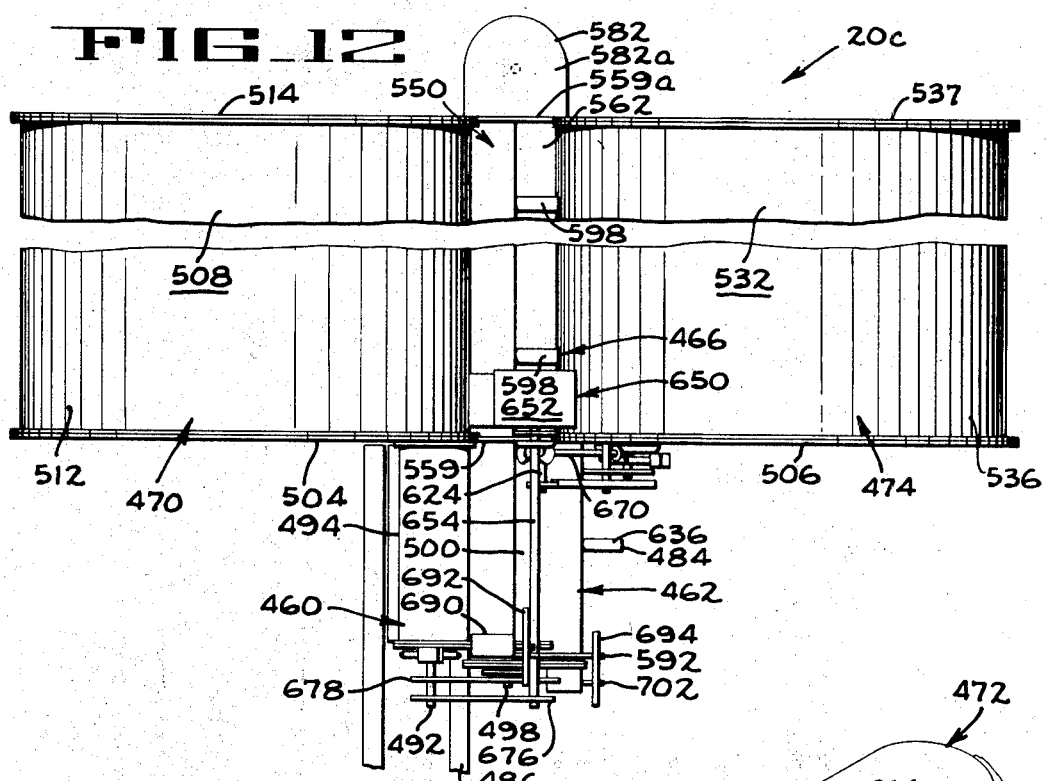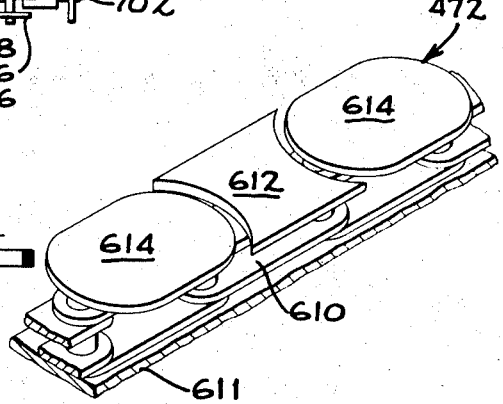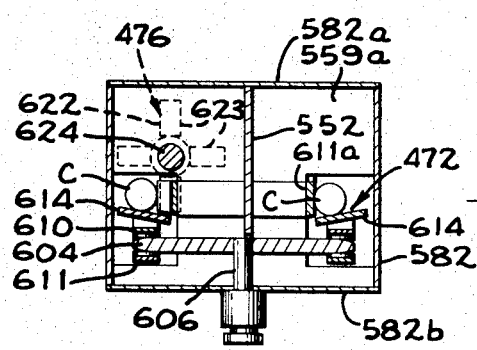

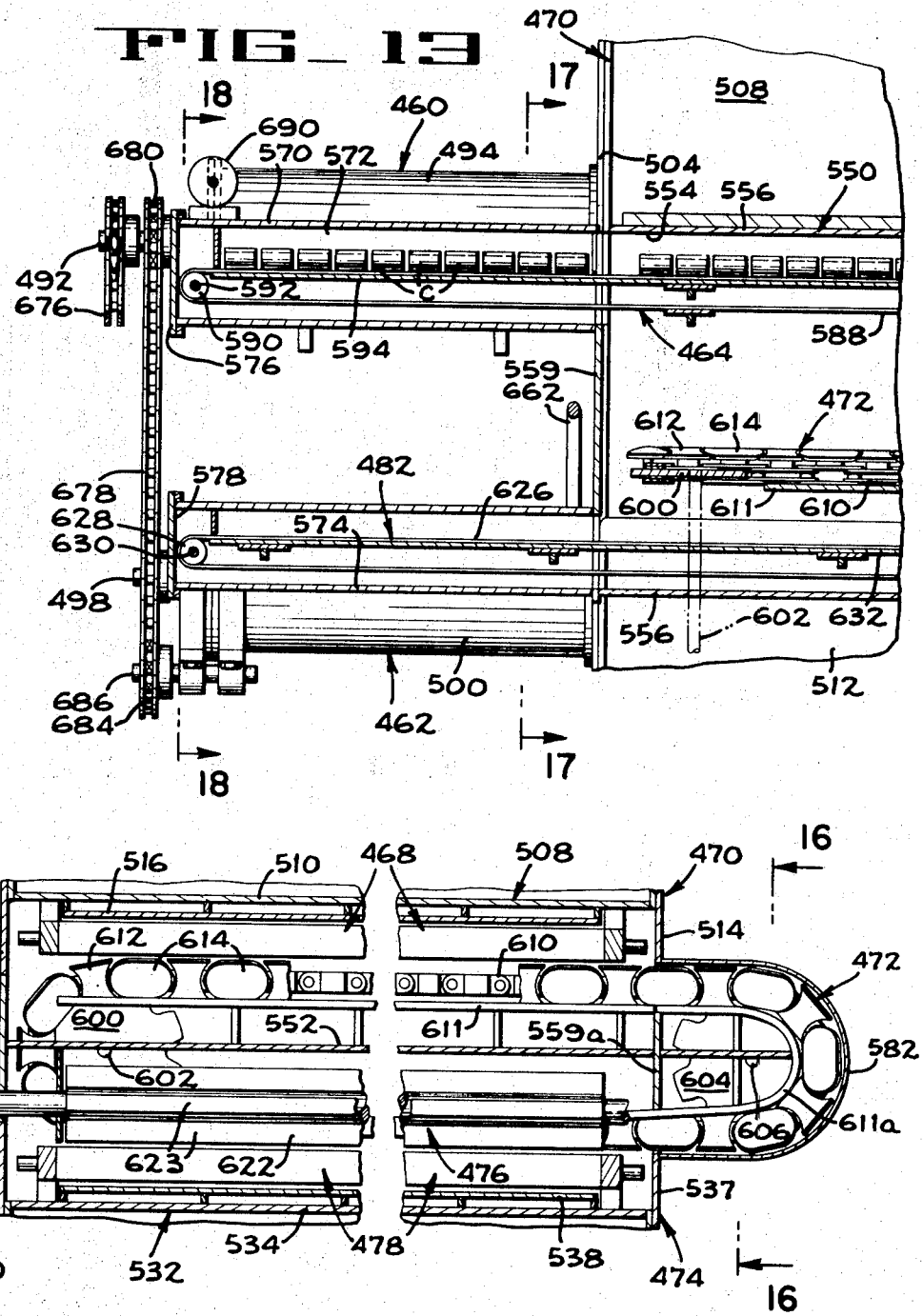

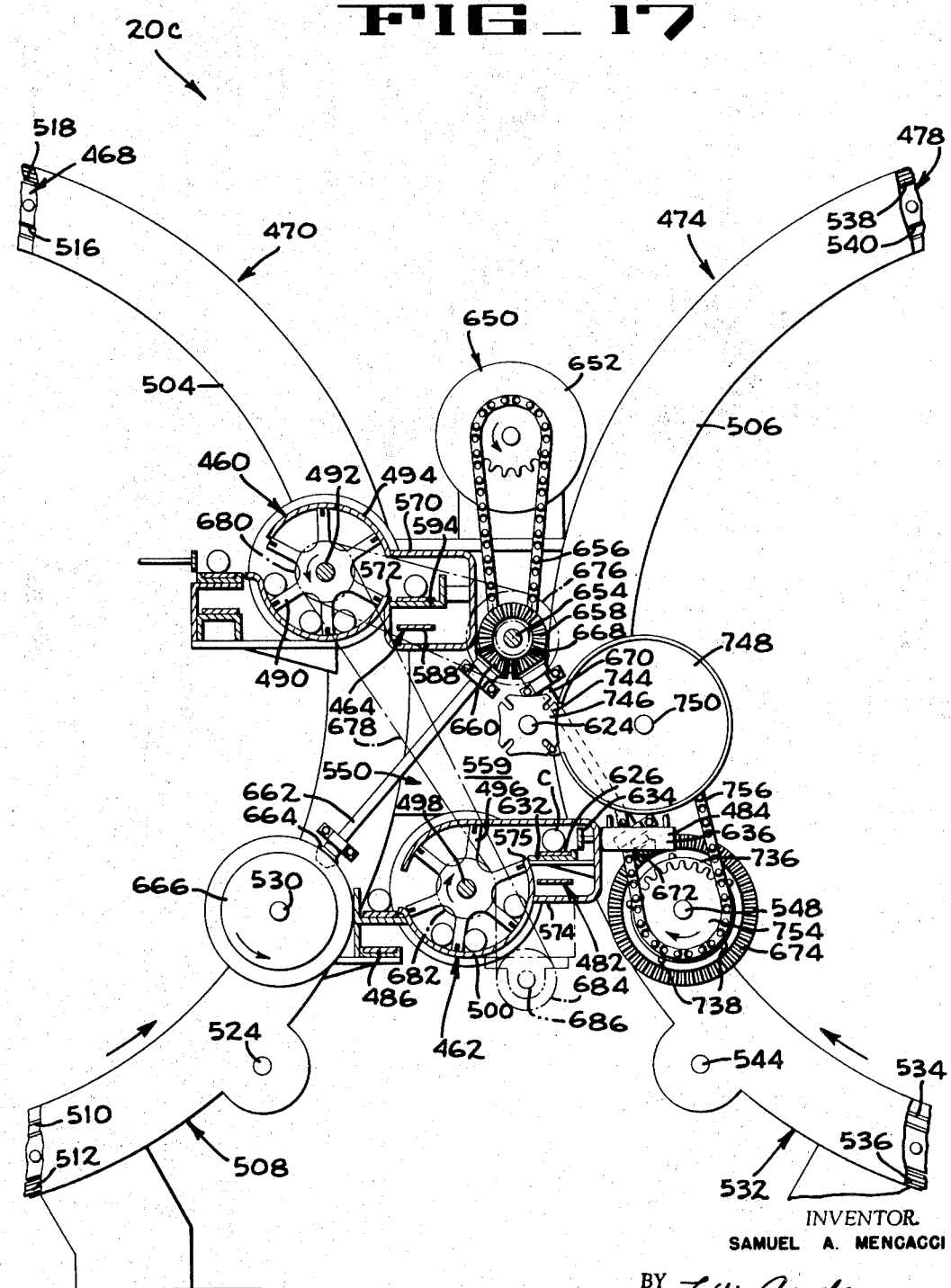

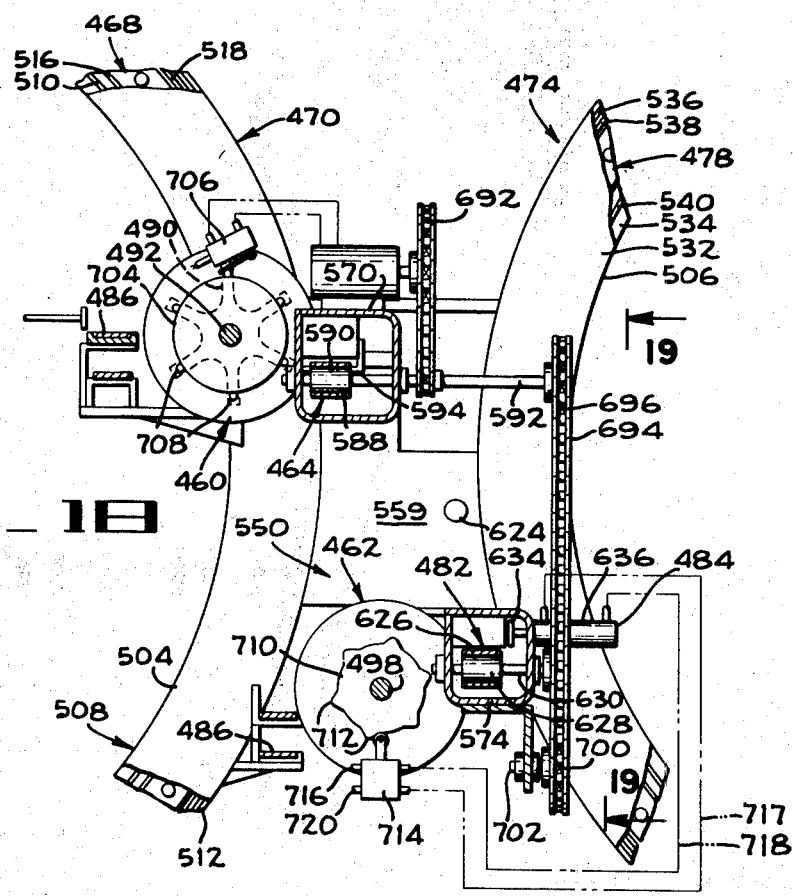
FIG_18
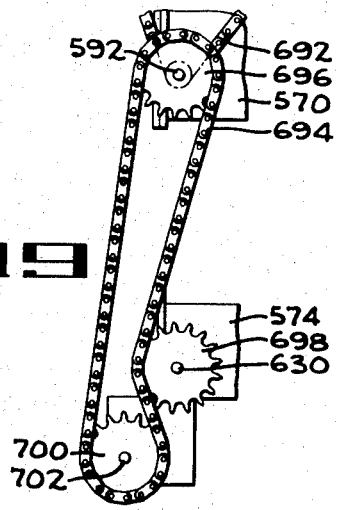
FIG_19

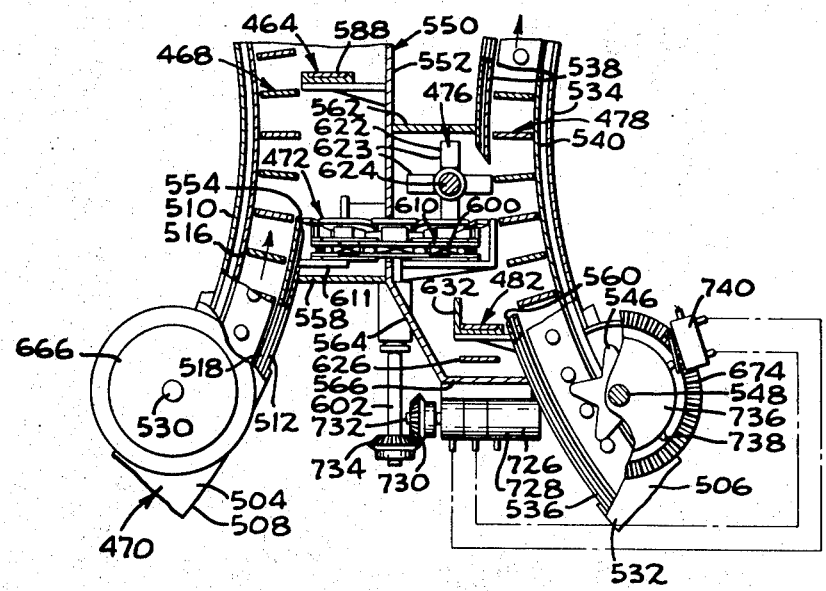
FIG_20
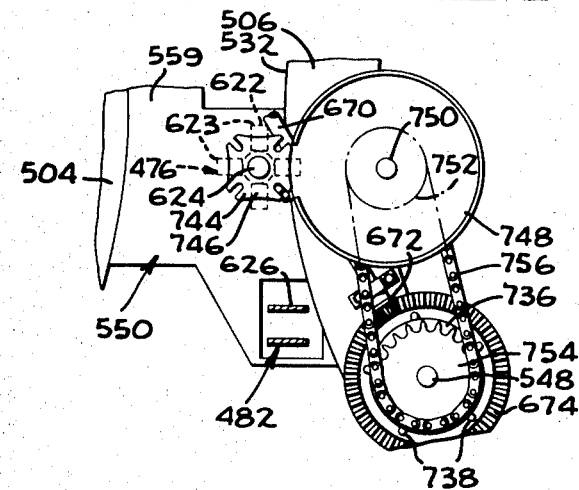
FIG_21
INVENTOR.
SAMUEL A. MENCACCI

ROTARY PRESSURE COOKER

CROSS REFERENCE TO RELATED APPLICATION

This application is a division of the pending United States application of Samuel A Mencacci, Ser. No. 658,105, which was filed on Aug. 3, 1967 and which issued as Pat. No. 3,495,523 on Feb. 17, 1970.

BACKGROUND OF THE INVENTION

This invention pertains to improved rotary cooking and cooling apparatus and more particularly relates to a cooking and cooling apparatus having annular processing chambers interconnected by transfer valves and having driven reels in each chamber adapted to advance rows of containers through the apparatus.

The pressure feed and discharge valves may be of the type disclosed in the pending application of Menacci et al. Ser. No. 530,191 which was filed on Feb. 25, 1966 now Pat. No. 3,340,791 which issued on Sept. 12, 1967.

The cooking and cooling apparatus of the present invention is especially suitable for handling cylindrical glass jars, such as the well known wide mouth baby food jars, although it is to be understood that cans, plastic containers or other types of jars may also be handled in the apparatus, and that the containers may be irregular in shape, for example, square.

In recent years glass jar manufacturers have provided jars which can withstand considerable temperature changes, and accordingly, can be processed without excessive glass breakage in cookers which gradually raise the temperature from normal room temperature to about 245° F. and then cool the containers back to approximately room temperature.

One known system for processing glass jars is to individually encapsulate each jar and to pass the same through a series of well known reel and spiral heat treatment apparatus. When handling encapsulated glass jars with this type of reel and spiral apparatus, five of the reel and spiral units are interconnected and usually include a rotary preheater, a rotary pressure preheater, a rotary sterilizer, a rotary cooler, and a rotary atmospheric cooler. These five processing units are not only expensive but they also require considerable floor space.

A much more difficult problem with the type system mentioned above is that each container is handled independently and is moved around a spiral path within each of the processing units from one end thereof to the other by a stationary spiral track which cooperates with a continuously rotating reel. Accordingly each container, or capsule, is subjected to considerable wear as it is spirally advanced through the several processing units. Also, since each container is handled independently in the system, it will be appreciated that if a processing speed of 400 containers per minute is desired, the individual containers must be moved at a very high rate of speed into, through, and out of the several reel and spiral heat treatment units. This high speed not only increases the glass breakage rate but also causes excessive wear to the machine and to the capsules within which the containers are confined. It will also be understood, if the containers were not encapsulated, the external surfaces of the glass jars would be scratched, and also, the jar caps would be damaged or dislodged from the jars due to their high speed sliding engagement with the spiral tracks within the several processing units.

When heating containers to a temperature substantially above the boiling point of water, it is necessary to subject the containers to a superatmospheric pressure. This is especially true when handling wide mouth glass jars since the caps tend to burst from the jars if the pressure within the jars exceeds the pressure acting on the external surfaces thereof.

SUMMARY OF THE INVENTION

The preferred embodiment of the rotary cooking and cooling apparatus of the present invention is designed to sterilize cooker length rows of glass containers having about 100 containers in each row without requiring that the containers be encapsulated. The apparatus continuously advances the rows of containers at the very slow speed of about four rows per minute through a plurality of annular heat treatment housings with each row of containers moving as a unit around an arcuate, rather than a helical path while in each housing. Because the housings are annular, rather than cylindrical, large diameter housings are used since only the relatively small annular end faces need be sealed, there being no need to seal the entire end area as would be required if a cylindrical housing of the same diameter were to be used. One or more small diameter processing housings are disposed within the large diameter annular housing.

The several housings are interconnected by transfer turrets which transfer the rows of containers between the several annular housings. At least the inlet transfer turret and the discharge transfer turret are formed as rotary pressure valves thus permitting the pressure within the housings to be above atmospheric pressure. Water maintained at the desired temperature and subjected to an overriding air pressure is the preferred heat treatment medium when handling jars. However, it will be understood that steam or a steam-air mixture may be used as the heating medium if desired.

Since the containers are handled as long rows rather than as individual containers, an apparatus which advances rows of 100 containers each at the very slow speed of four rows per minute is capable of sterilizing containers at the rate of 400 containers per minute when the largest annular processing chamber is about 12 feet in diameter and about 40 feet long. An apparatus of this size would have a holding capacity of about 16,000 containers.

It is, therefore, one object of the present invention to provide a rotary pressure cooking and cooling apparatus adapted to handle long cooker length rows of containers and to pass the rows of containers through annular processing housings at very slow speeds.

Another object is to provide a rotary cooking and cooling apparatus capable of handling glass jars without encapsulation.

BRIEF DESCRIPTION OF THE DRAWINGS

FIG. 1 is a side elevation of the preferred embodiment of the cooking and cooling apparatus of the present invention, certain parts being cut away and other parts being shown in section.

FIG. 2 is an enlarged diagrammatic end elevation of the apparatus of FIG. 1 with certain parts cut away and other parts shown in section or in phantom.

FIG. 2A is an enlarged vertical section illustrating a fragment of one of the annular housings with a portion of the reel therein.

FIG. 2B is an enlarged section taken along lines 2B–2B of FIG. 2 illustrating one sealed end portion of an annular housing with the reel therein.

FIG. 3 is an enlarged perspective of a fragment of the preheater illustrated in FIG. 2.

FIG. 4 is an enlarged section taken along lines 4–4 of FIG. 1.

FIG. 5 is an enlarged perspective of a fragment of the precooler illustrated in FIG. 2 showing a transfer device and a let-down device which cooperate to transfer the rows of containers from the precooler to the final cooler.

FIG. 6 is a perspective illustrating the drive parts at one end of the cooking and cooling apparatus.

FIG. 6A is a perspective of one end of one of the reels showing several rows of containers positioned therein.

FIG. 7 is a diagrammatic end elevation of a second embodiment of the cooking and cooling apparatus of the present invention, certain parts being cut away and other parts being shown in section and in phantom.

FIG. 8 is a perspective of one end of the apparatus of FIG. 7 illustrating the drive parts at that end, certain annular housings of the apparatus being illustrated in phantom.

FIG. 9 is a diagrammatic end elevation of a third embodiment of the cooking and cooling apparatus illustrating structure for agitating the containers while in the preheater and final cooler, certain parts being cut away and other parts being shown in section and in phantom.

FIG. 9A is an enlarged vertical section of a fragment of the apparatus of FIG. 9.

FIG. 10 is a diagrammatic end elevation of a forth embodiment of the cooking and cooling apparatus illustrating in phantom, feed and discharge valves which handle groups of containers which are shorter than cooker length rows, and illustrates in section conveyors for forming the groups into cooker length rows and for reforming the cooker length rows into groups after processing.

FIG. 11 is a diagrammatic perspective of the feed and discharge end of the apparatus of FIG. 10, certain parts being cut away.

FIG. 12 is a plan of the apparatus of FIG. 10 illustrating the location of the feed and discharge valves and having the longitudinal central portion of the processing housings cut away.

FIG. 13 is an enlarged vertical section taken along lines 13–13 of FIG. 10 illustrating the row forming and group reforming conveyors.

FIG. 14 is an enlarged horizontal section taken along the line 14–14 of FIG. 10 illustrating a transfer conveyor and a transfer device, the central portion of said conveyor being cut away.

FIG. 15 is an enlarged perspective of a portion of the transfer conveyor.

FIG. 16 is an enlarged vertical section taken along lines 16–16 of FIG. 14.

FIG. 17 is an enlarged vertical section taken along line 17–17 of FIG. 13, certain of the drive parts being shown in phantom.

FIG. 18 is an enlarged vertical section taken along lines 18–18 of FIG. 13 illustrating the drive parts for the row forming and group reforming conveyors, other drive parts being omitted for clarity.

FIG. 19 is a vertical section taken along lines 19–19 of FIG. 18.

FIG. 20 is a fragmentary vertical elevation with parts broken away illustrating the drive for the transfer conveyor.

FIG. 21 is a vertical elevation of a fragment of the apparatus illustrating the drive for the star wheel transfer device.

DESCRIPTION OF PREFERRED EMBODIMENTS

The rotary pressure cooking and cooling apparatus 20 (FIGS. 1 to 6) of the present invention comprises, in general, a rotary pressure feed valve 22 which advances cooker length rows of about 100 containers C in a counterclockwise direction into a rotary preheater 24 at the rate of about four rows per minute, which preheater raises the temperature of the containers to substantially that of the sterilizing temperature. The preheater 24 advances the rows of containers into a transfer turret 26 which discharges the containers into a rotary sterilizer 28 with the aid of a rotary let-down device 30. The sterilizer 28 (FIG. 2) moves the rows of containers in a counterclockwise direction during which time the contents of the containers are sterilized, and thereafter discharges the rows of sterilized containers into a transfer turret 32. The transfer turret 32, with the aid of a let-down device 34, transfers the rows of containers into a rotary precooler 36 which moves the rows of containers in a clockwise direction and discharges them, with the aid of a transfer device 38 and a let-down device 40 into a final cooler 42. The final cooler 42 advances the containers in a counterclockwise direction and discharges them into a pressure discharge valve 44 which releases the fully processed and cooled rows of containers onto a take-away conveyor 46 for discharge from the apparatus.

Although only the details at one end of the cooking and cooling apparatus 20 are illustrated in FIGS. 2, 3 and 5 of the drawings, it will be understood that the other end of the apparatus is constructed in exactly the same manner. It will further be understood that the above described elements may be constructed as relatively short modules that are bolted together to make a cooking and cooling apparatus of the desired length. For example, four 10-foot modules may be bolted together to provide a cooker having a total length of 40 feet. If a 4-section modular construction is used, it will be understood that both ends of each module will be constructed substantially as illustrated in FIG. 2, and that each row of containers will include four groups of containers which are slightly spaced from each other so as to provide voids in each row opposite the intermediate walls of the modules. However, to simplify the detailed description to follow, the cooking and cooling apparatus 20 will be described as a single long unit rather than as a unit made up of several interconnected modular sections.

More particularly, the preheater 24 (FIGS. 2 and 3) comprises an elongated annular preheater housing 50 defined by an inner cylindrical wall 52, an outer substantially cylindrical wall 54 and two annular end plates 56 (FIG. 1) secured in fluidtight engagement to the ends of the walls 52 and 54. The pressure feed valve 22 is secured to the outer wall 54 in communication with an elongated inlet opening 58 therein, and the transfer turret 26 is likewise secured to the outer wall in communication with an elongated outlet opening 60 therein as clearly indicated in FIG. 2.

An annular reel 62 (FIGS. 2, 3 and 6A) is disposed within the preheater housing 50 and is concentric with the walls 52 and 54. The reel 62 includes a pair of identical end rings 64, one ring being disposed adjacent each end of the housing 50, and a plurality of evenly spaced radially extending bars 66 which are welded to the rings 64 and extend longitudinally of the housing 50. Each ring 64 is mounted on trunnions 68 and 70 which are secured on shafts 72 and 74, respectively, journaled in the housing end walls 56. The trunnions 68 and 70 are received in semicylindrical troughs 76 and 78, respectively, that extend the full length of the housing 50. The troughs 76 and 78 are sealed in fluidtight engagement to the lower portion of the cylindrical outer wall 54 and are also secured in fluidtight engagement to the end plates 56 as by bolting. A plurality of equally spaced drive pins 80 are secured to and project outwardly from each ring 64. The pins 80 on each ring 64 mesh with a drive gear 82, and the drive gears 82 are keyed to a preheater drive shaft 84 that preferably extends the full length of the apparatus 20 and is journaled in bearings mounted on the two annular end plates 56. A semicylindrical trough 86 is secured in fluidtight engagement to the outer housing wall 54 and to the end plates 56 and cooperates with the annular housing 50 to provide a fluidtight area within which the drive gears 82 operate.

In order to minimize the presence of scratches and rust marks on the containers which marks mar the appearance of the containers, and in order to improve circulation of the heat treatment medium through the preheater housing 50, a stainless steel inner liner 88 and a stainless steel outer liner 90 are provided. The inner liner 88 (FIG. 3) is a cylindrical tube which has a plurality of spacer rings 94 welded thereto and supported by the inner cylindrical wall 52 of the preheater housing 50. A plurality of openings 96, such as slots, are formed in the liner 88 to permit free flow of heat transfer fluid therethrough. The outer liner 90 comprises a generally cylindrical member having an elongated inlet opening and outlet opening therein which are lined with the inlet opening 58 and outlet openings 60, respectively, of the outer cylindrical wall 54 of the preheater housing 50. A plurality of spaced rings 104 (FIG. 3) are welded to the outer surface of the outer liner 90 and space the liner from the outer housing wall 54 so that fluid can freely circulate between the liner 90 and wall 54 as well as through slots 106 in the liner 90.

The pressure feed valve 22 comprises a substantially cylindrical housing 110 having an elongated inlet opening 112 for receiving rows of containers from a row forming device 114 of any well known design, and an elongated discharge opening communicating with the opening 58 in the preheater housing 50. A reel 116 is mounted on a shaft 117 and has a plurality of equally spaced pockets 118 therein. The reel shaft 117 is journaled in the end plates of the housing 110 and is continuously driven in a clockwise direction (FIG. 2) to receive rows of containers which are deflected off the row forming device 114 by an intermittently operated hydraulic deflector 120. Elongated cam operated paddles 122 may be provided in each pocket 118 for first gently guiding each row of containers into a pocket and for subsequently gently deflecting each row out of a pocket and between adjacent bars 66 of the preheater reel 62. The pockets 118 of the reel 116 are individually sealed to the housing 110 in a well known manner thus permitting superatmospheric pressure to be maintained in the preheater housing 50.

The specific details of the pressure feed valve 22 form no part of the present invention, accordingly, these parts will not be described in detail. If a complete description of the pressure valve is desired, reference may be had to the aforementioned Mencacci et al. application.

As mentioned previously, the preferred heat treatment medium used in the several processing chambers of the cooking and cooling apparatus 20 is water which is maintained at the desired temperatures in each chamber by suitable thermostatic controls (not shown) and which is maintained under pressure by an overriding air pressure in the preheater housing 50. The water level in the preheater 24 is maintained at a level slightly below the level of the inlet opening 58.

In the preferred embodiment of the invention rows of containers moving through the preheater 24 will be gradually raised to about the sterilizing temperature, for example 250° F., and will be discharged through the preheater discharge opening into pockets 126 in the reel 128 of the transfer turret 26. The reel 128 is mounted on a shaft 130 and is continuously driven in a clockwise direction (FIG. 2) within a cylindrical housing 132 having an elongated inlet opening and an elongated discharge opening 136 therein. Since the temperature of the containers is raised while in the preheater 24 to substantially the sterilizing temperature, and since there is no desire to maintain a pressure differential between the preheater 24 and the sterilizer 28, the pockets 126 of the reel 128 need not be sealed to the housing 132.

The sterilizer 28 is constructed in substantially the same manner as the preheater 24 and includes an annular housing 140 defined by cylindrical outer shell 142, a cylindrical inner shell 143 concentric therewith, and a pair of annular end plates 144 (FIG. 1) which are connected together in fluidtight engagement to define an annular sterilizing chamber. An inner liner 148 and an outer liner 150 that are similar to the liners 80 and 90 of the preheater 92 are mounted within the housing 140. The outer shell 142 has semicylindrical troughs 152, 154 and 156 secured in fluidtight relation thereto and to the end plates 144 which accommodate, respectively, a sterilizer drive shaft 158 having drive gears 160 secured near opposite ends thereof, a first trunnion shaft 162 having trunnions 164 keyed thereon near opposite ends thereof, and a second trunnion shaft 166 having trunnions (not shown) keyed thereon near opposite ends thereof. The shafts 158, 162 and 166 are journaled in bearings secured to the end plates 144. A large diameter sterilizer reel 170 is rotatably mounted within the housing 140 and comprises a pair of rings 172 (only one being shown) having a plurality of evenly spaced container advancing bars 174, that define row accommodating pockets 175, welded thereto and extending therebetween. A plurality of evenly spaced drive pins 176 are secured to each ring 172 and mesh with the associated drive gears 160 which continuously drive the reel 170 in a counterclockwise direction (FIG. 2) at the rate of about four pockets per minute.

The discharge opening 136 of the transfer turret 26 communicates with an elongated inlet opening formed in the outer shell 142 and in the outer liner 150 and permits rows of containers to pass therethrough when entering the rotary sterilizer 28. The rotary let-down device 30 is positioned immediately below the inlet opening in order to prevent injury to the rows of containers by decreasing the distance they drop as they are discharged by the transfer turret 26 and are accepted within one of the pockets 175 of the sterilizer 28.

The let-down device 30 (FIGS. 2 and 4) comprises a shaft 180 which is journaled in the end plates 144 and has three longitudinally extending rows of equally spaced radially extending let-down fingers 182 secured thereto. The let-down device 30 is continuously driven so that each row of longitudinally spaced fingers 182 pass through a series of longitudinally spaced slots 184 in the inner liner 148. The let-down device 30 is confined within a trough 186 (FIG. 2) that is secured in fluidtight engagement to the inner shell 142 and to the end plates 144. Thus, as the sterilizer reel is rotated in a counterclockwise direction (FIG. 2) one row of let-down fingers 182 enters the particular reel pocket, 175 that is about to receive a row of containers from the transfer turret 26, thus greatly reducing the distance the row of containers will drop when entering the pocket thereby minimizing mechanical impact to the containers when they are transferred into the sterilizer.

Although the glass jars are designed to handle considerable impact forces and also substantial thermal shock due to an abrupt change of temperature, there are always a few weak containers which will break while in the apparatus 20. Accordingly, a broken glass eliminator 190 is disposed adjacent the let-down device 30. The broken glass eliminator 190 comprises a screw conveyor 192 mounted on a shaft 193 and disposed below a grill defined by a plurality of spaced bars 194, which grill forms part of the inner liner 148. The space between the bars 194 is wide enough to permit large pieces of glass to pass therethrough, but is not large enough to permit a sound jar to pass therethrough.

The conveyor 192 extends the full length of the cooker and is housed in a trough 196 that is sealed in fluidtight engagement to the inner shell 143 and at its inlet end to one of the end plates 144. The discharge end of the screw conveyor 192 (FIGS. 1 and 4) projects through an opening in the adjacent end plate 144 and into an elbow 198 secured in fluidtight relation to the end plate 144 adjacent the discharge end of the screw conveyor 192. The screw conveyor shaft 193 is continuously driven and is journaled in one of the end plates 144 and in the elbow 198.

The elbow 198 forms part of an accumulator 200 which includes an upper gate valve 202 (FIG. 1) secured to the elbow 198 and to an accumulator pipe section 204, and a lower gate valve 206 secured to a pipe section 204. During normal operation, the upper valve 204 is open and the lower valve 206 is closed. Accordingly, all broken glass conveyed from below the bars 194 will fall into the accumulator between the two valves. The upper valve 202 is periodically opened and the lower valve closed so as to periodically release broken glass from the accumulator without interference with the normal operation of the cooking and cooling apparatus 20.

After the rows of containers have been moved through the sterilizer 28, they are transferred through an opening 210 in the inner liner 148 and inner shell 143 of the sterilizer 28 into the transfer turret 32 which includes a pocketed reel 212 mounted on a shaft 214. The transfer turret 32 may be identical to the feed valve 22 except, in accordance with the preferred embodiment of the present invention, the turret 32 need not be a pressure sealing valve but may permit fluid to freely flow therepast.

The rows of sterilized containers C are transferred by the turret 32 into the precooler 36 which includes an annular housing 216 that is concentric with but smaller in diameter than the sterilizer housing 140. The housing 216 is constructed in substantially the same manner as the sterilizer housing 140 and has a precooler reel 218 therein which is substantially the same as the preheater reel 62 and sterilizer reel 170. Accordingly, the housing 216 and reel 218 will not be described in detail.

The reel 218 is driven in a clockwise direction (FIG. 2) by drive gears 220 keyed near the ends of a precooler drive shaft 222, and the reel is rotatably supported by pairs of trunnions 224 (only one being shown) mounted on shafts 226 and 228.

The shafts 222, 226 and 228 are journaled on annular end plates 230 which serve to close the opposite ends of both the precooler 36 and final cooler 42 as a unit. The end plates 230 may be connected to the associated end plates 144 of the sterilizer by any suitable means, such as by annular discs 231 (FIG. 1) which are bolted to the associated plates 144 and which are apertured to permit the several shafts to project therethrough. The shafts 222, 226 and 228, and the gears or trunnions thereon, are disposed within semicylindrical housings 232, 234 and 236, respectively, which are sealed to the end plate 230 and to the outer shell of the annular housing 216.

The rows of containers released from the transfer turret 32 are received in adjacent pockets of the reel 218 and are gently lowered against the inner liner 219 (FIG. 2) of the precooler 36 by the let-down device 34 which is identical to the let-down device 30 (FIG. 4) and, accordingly, will not be described in detail. As the rows of containers are moved through the precooler 36 in a clockwise direction (FIG. 2) they are gradually cooled and are then discharged through an elongated slot 238 (FIG. 5) in the inner liner 219 and inner shell of the housing 216 into the final cooler 42.

The transfer device 38 (FIGS. 2 and 5) is provided in order to gently transfer the rows of containers between the precooler 36 and final cooler 42. The transfer device 38 comprises a three-pocketed rotor 244 (FIG. 5) that is mounted on a continuously driven shaft 246 journaled in the end plates 230. The shaft 246 is continuously driven in a clockwise direction and advances each row, in turn, downwardly past an elongated arcuate guide plate 248 which is an extension of the inner liner 219 of the precooler housing 216 and is concentric with the shaft 246. Thus, complete control is maintained over each row of containers by the rotor 244 and arcuate plate 248 (FIG. 5) until the row is released into associated pockets in the final cooler 42. The let-down device 40 in the final cooler 42 cooperates with the transfer device 48 to gently lower each row fully into its associated pocket.

The final cooler 42 is concentric with and is constructed in a manner quite similar to the preheater 24, sterilizer 28, and precooler 36. The final cooler 42 is disposed within the precooler 36 and comprises a housing 252 having an inner shell 254 and an outer shell 256 sealed to the end plates 230. An inner liner 258 and outer liner 260 are fitted in the housing 252. A final cooler reel 262 is similar to the preheater reel 62 and is rotatably mounted within the housing 252 on pairs of trunnions 264 (FIG. 2) near the upper end thereof. The trunnions 264 are keyed to shafts 266 which are journaled in the end plates 230 and are confined within the housing by troughs 268 and 270 secured in fluidtight engagement to the inner shell 254 and end plates 230. The reel 262 is driven in a counterclockwise direction by gears 272 (only one being shown) keyed to a drive shaft 274 that is journaled on the end plates 230. The shaft 274 and gears 272 are confined within a semicylindrical trough 276 that is sealed to the inner shell 254 and to the end plates 230.

After the rows of containers have been moved in a counterclockwise direction through the final cooler 42 at which time they are cooled to a temperature somewhat below the boiling point of water at atmospheric pressure, the rows gravitate one at a time into the pressure discharge valve 44. The pressure discharge valve 44 is identical to the pressure feed valve 22 and includes an elongated pocketed reel 280 keyed to a shaft 282 which is continuously driven in a counterclockwise direction. The reel 280 is rotatable within and sealed to a cylindrical housing 284 supported by the inner shell 254 and has an elongated inlet opening 286 communicating with the housing 252 and an elongated discharge opening 288 which discharges the rows of processed and cooled containers onto the take-away conveyor 46.

A drive system 300 (FIGS. 1, 2 and 6) is provided in order to continuously drive the several rotary components of the apparatus 20 in timed relation and at the rate of about four rows per minute. Although the drive system 300 includes identical parts on both ends of the apparatus, only the drive parts at one end of the apparatus will be described in detail in order to simplify the description thereof, and comparable parts on the other end of the apparatus will be assigned the same numerals.

The drive system 300 (FIGS. 2 and 6) comprises a gear motor 302 which is connected to a longitudinally extending main drive shaft 304 by a chain drive 306 and continuously driven this shaft in a clockwise direction. The shaft 304 is journaled in brackets 307 bolted to the sterilizer housing 140 and extends the full length of the apparatus 20. The preheater drive shaft 84 is driven from the main drive shaft 304 by a chain drive 308, thereby driving the preheater reel 62 in a counterclockwise direction by means of the gears 82. The reel 116 of the pressure feed valve 22 is driven in a clockwise direction by a chain drive 310 which interconnects the shafts 84 and 117. The reel 128 of the transfer turret 26 is driven in a clockwise direction by a chain drive 312 which connects the shaft 117 of the feed valve 22 to the shaft 130 of the transfer turret 26.

A chain drive 314 interconnects the main drive shaft 304 and the shaft 158 thereby driving the shaft 158 in a clockwise direction and the reel 170 of the sterilizer 28 in a counterclockwise direction. A gear 316 keyed to the shaft 158 meshes with a gear 318 keyed to the shaft 222 thereby driving the precooler gears 220 in a counterclockwise direction and the reel 218 of the precooler 36 in a clockwise direction. The reel 262 of the final cooler 42 is continuously driven in a counterclockwise direction by a chain drive 320 which interconnects the shafts 222 and 274.

The reel 212 of the transfer turret 32 is driven in a counterclockwise direction by a chain drive 322 which is trained around a sprocket keyed to the shaft 130 of the transfer turret 26, around an idler sprocket 326 rotatably supported by a bracket 328 secured to the precooler housing 216, and around a sprocket 330 (FIG. 6) keyed to the shaft 214 of the transfer turret 32. The reel 280 of the discharge valve 44 is driven in a counterclockwise direction, and the let-down device 34 is driven in a clockwise direction by a chain drive 332. The transfer device 38 is driven in a clockwise direction by a chain drive 334 interconnecting the let-down device 34 and the shaft 246 of the transfer device 38.

Power is transmitted from the shaft 282 of the discharge valve 44 to the let-down device 40 by a chain drive 336 thereby driving the let-down device 40 in a counterclockwise direction. The let-down device 40 is connected to the let-down device 30 by a chain drive 338 and drives the device 30 in a counterclockwise direction, while a chain drive 340 connects the let-down device 30 to the screw conveyor shaft 193 and drives the conveyor 192 in a counterclockwise direction Thus, the drive system 300 continuously drives all row handling components of the cooking and cooling apparatus 20 in the proper direction and at a rate of about four rows per minute. Although the let-down devices 30, 34 and 40 have been shown as being driven by chain drives, it is apparent that these devices could be driven directly from the reel of the sterilizer 28, precooler 37, and final cooler 42 if desired.

As mentioned previously, the preferred heat treatment medium is water maintained at the desired temperature and subjected to an overriding air pressure in the preheater 24. It will be appreciated therefore that water will be discharged from the discharge valve 44 (FIG. 2) each time a row of processed containers C is discharged from the apparatus 20 onto the take-away conveyor 46. This water may be collected by a trough 350 and be returned to the precooler 36 of the apparatus 20, along with additional make up water, by a pump P as diagrammatically illustrated in FIG. 2.

Air under pressure, for example 30 p.s.i.g. if the sterilizing temperature is 250° F. may be directed into the preheater 24 through a valved conduit 352, and make up water may be added to the preheater 24 by a valved conduit 354. Steam is directed into the preheater 24 and into the sterilizer 28 by a conduit system 356 diagrammatically illustrated in FIG. 2 in order to heat the water to the desired temperature. The conduit system 356 preferably includes a plurality of longitudinally extending thermostatically controlled conduits disposed around the periphery of the preheater 24 and sterilizer 28 so that steam may be injected into the associated housings as required.

A second thermostatically controlled conduit system 360, which system includes the pump P and trough 350, directs cool water into the precooler 36 and final cooler 42 at spaced intervals therearound. Excess water is drained from the system by a conduit 362 having a pressure relief valve 364 therein, which relief valve opens when the pressure within the apparatus 20 raises above a predetermined desired level.

Although the specific details of the conduit systems 356 and 360 form no part of the present invention, and the specific temperatures and overriding pressure maintained in the apparatus will vary in accordance with the specific product being handled, it will be noted that the annular design, as opposed to a cylindrical design, of the several processing chambers readily lends itself to maintaining the water in the preheater 24 at variable temperature so that the water temperature progressively increases from the upper end thereof to a point immediately adjacent the transfer turret 26. Similarly, the water in the precooler 36 and final cooler 42 may progressively decrease in temperature from substantially the sterilizing temperature adjacent the transfer turret to a temperature well below the boiling point of water at atmospheric pressure adjacent the discharge valve 44.

If desired, steam may be directed into the transfer valve 26 from a conduit system 366 to abruptly raise the temperature of the jars in the transfer turret 26 thereby subjecting the jars to a thermal shock which will cause all the defective jars in the rows of containers passing therethrough to break prior to reaching the screw conveyor 192 thereby assuring that the screw conveyor will advance all broken containers out of the apparatus 20 rather than permitting the jars to break in some other part of the apparatus downstream of the screw conveyor 192. It will also be understood that a thermal shock may be imparted to the glass jars as the jars enter the sterilizer instead of when the jars are in the transfer turret.

In the operation of the cooking and cooling apparatus 20 of the present invention rows of containers, for example, 100 containers being present in each row, are deflected from the row forming device 114 by the hydraulic deflector 120 into the rotary pressure feed valve 22. The rotary feed valve 22 transfers the rows of containers at the rate of about four rows per minute into the pockets of the reel 62 of the preheater 24. While in the preheater, the rows of containers first move through an atmosphere of air maintained at an overriding pressure of about 30 p.s.i. gauge and then move the containers into water which is maintained in the range of about 1400° F. to 1600° F. at the inlet end and gradually increases to a temperature of about 210° F. to 250° F. adjacent the opening leading to the transfer turret 26.

If it is desired to induce glass breakage of defective containers while the containers move through the turret 26, steam sufficient to raise the temperature of the heating medium within the turret 26 about 5° higher than the sterilizing temperature is introduced into the turret 26 through the conduit 366 thereby imparting a thermal shock to the glass walls of the containers which will cause any defective containers to break while in the pockets of the transfer turret 26.

The rows of containers are then transferred into the pockets 175 of the reel 170 of the sterilizer 28 with the aid of the let-down device 30, and gradually advances these containers in a counterclockwise direction (FIG. 2). As these containers move over the spaced bars 194, all broken containers including caps and the product therein fall into the trough 196 and are conveyed by the screw conveyor 192 into the accumulator 200 (FIGS. 1 and 4) for subsequent removal from the apparatus 20.

A temperature of about 250° F. to 275° F. is maintained in the sterilizer thereby completely sterilizing the product by the time the rows of containers have been released into the reel 212 of the transfer turret 32. The transfer turret 32 then lowers the rows of containers with the aid of the let-down device 34, into the reel pockets of the reel 218 of the precooler 36. The reel 218 then advances the containers in a clockwise direction through cooling water in the precooler 36 until the containers engage the transfer device 38, which with the aid of the arcuate guide 248 (FIG. 5) and the let-down device 40, lowers the rows of partially cooled containers into the pockets of the reel 262 of the final cooler 42. The reel 262 then advances the rows of containers in a counterclockwise direction through the coolant until the containers are released into the pockets of the rotary discharge valve 44 which valve discharges the rows of containers one at a time upon the takeaway conveyor 290 for removal from the apparatus 20. The cooling water introduced into the precooler 36 and final cooler 42 through the conduit system 360 is effective to gradually cool the rows of containers from about 250° adjacent the transfer valve 32 to about 104° F. adjacent the discharge valve 44.

A second embodiment of the cooking and cooling apparatus 20a of the present invention is illustrated in FIGS. 7 and 8. Since the parts of the apparatus 20a are quite similar to the apparatus 20, the specific details of the apparatus 20a will not be described and parts of the apparatus 20a which are similar or identical to parts of the apparatus 20 will be assigned the same numeral followed by the letter "a."

The apparatus 20a is designed primarily for cylindrical cans, rather than glass jars, however, it will be understood that jars can also be processed by the apparatus 20a. The apparatus 20a receives rows of about 100 containers each from a row forming unit 114a at the rate of about four rows per minute and moves the rows of containers into a pressure feed valve 22a which includes a pocketed reel 116a that advances the rows into a preheater 24a having hot water therein subjected to an overriding air pressure. The containers are heated to about the sterilizing temperature while in the annular preheating housing 50a and are then advanced by the preheater reel 62a into the reel 128a of a rotary pressure valve 26a, which valve may be identical in construction to the pressure valve 22a. The pressure valve 26a, aided by the let-down device 30a, discharges the rows of containers into the annular housing 140a of the sterilizer 28a which sterilizer includes a reel 170a that continuously advances the containers therethrough. Steam at a temperature of about 250° F. is directed into the sterilizer 28a through a conduit system 389 is the preferred heat treatment medium used in the sterilizer.

After the rows of containers have been sterilized, they are transferred into a pressure transfer valve 32a which is preferably slightly larger in diameter than the feed valve 22a but is constructed in substantially the same way having a pocketed reel 212a sealed to a generally cylindrical housing. In addition to providing a pressure seal for the sterilizer 28a, cooling water and air under pressure are directed into the pockets of the reel 212a through a conduit system 390 to flash cool the container sufficiently to condense the condensible gasses therein. With the steam within the containers condensed, the pressure within the containers is low enough to permit the rows of flash cooled cans to be transferred, with the aid of a let-down device 34a, into a final cooler 42a which is maintained at atmospheric pressure. Cooling water may be directed into the housing 252a of the final cooler from conduits 391 either as a spray or by flooding. If spray cooling is desired, it will be understood that the housing 252a may be perforated to permit draining of the spray coolant.

The reel 262a of the final cooler moves the rows of containers through the cooling water in the housing 252a until the containers and contents are cooled to about 105° F. and then moves the containers into the reel 280a of the discharge valve 44a. The reel 280a of the discharge valve 44a need not provide a pressure tight seal with the housing, as was the case in the first embodiment of the invention, but may permit fluid to pass freely therethrough. The fully processed rows of containers are then released from the discharge valve 44a onto a take-away conveyor 290a for removal from the apparatus 20a.

The movable parts of the apparatus 20a are continuously driven at the rate of about four rows per minute by a drive system 392 (FIGS. 7 and 8) which receive power from a drive motor 394. The motor 394 is connected to a main drive shaft 396, which extends the full length of the apparatus 20a, by a chain drive 398 which drives the shaft in a clockwise direction. A chain drive 400 connects the shaft 396 to the sterilizer drive shaft 158a thereby driving the sterilizer reel 170a in a counterclockwise direction. Another chain drive 402 is trained around an idler sprocket 404 journaled on the apparatus 20a, a sprocket 406 (FIG. 8) keyed to the shaft 158a and around a sprocket 408 keyed to the drive shaft 274a of the final cooler 42a thereby driving the final cooler reel 262a in a clockwise direction. The reel 280a of the discharge valve 44a is driven in a counterclockwise direction by a chain drive 409 which interconnects the shaft 274a and the shaft 282a of the discharge valve 44a.

The reel 62a of the preheater 24a is driven in a counterclockwise direction by a chain drive 410 which connects the shaft 158a to the preheater drive shaft 84a. The preheater drive shaft 84a is connected to the shaft 117a of the pressure feed valve 22a by a chain drive 412 thereby driving the reel 116a of the feed valve 22a in a clockwise direction. A chain drive 414 connects the shaft 117a to the shaft 130a of the pressure transfer valve 26a thereby driving the reel 128a in a clockwise direction.

The reel 212a of the pressure transfer valve 32a is driven in a counterclockwise direction by a chain drive 416 which is trained around a sprocket on the shaft 130a, a sprocket on the shaft 214a of the transfer valve 32a, and an idler sprocket 418 journaled on a shaft 420 secured to the apparatus 20a. A sprocket 422 connected to the idler sprocket 418 forms part of a chain drive 424 which drives the let-down device 34a in a clockwise direction, and a chain drive 426 connects the shaft 214a to the let-down device 30a to drive the same in a counterclockwise direction. It will be understood that other drive parts (not shown) similar to the above described drive parts are provided at the other end of the apparatus 20a.

Although not illustrated in the drawings, it will be understood that suitable frame means, such as annular end plates, are provided for connecting the cooler 42a to the sterilizer 28a.

Since the operation of the apparatus 20a is quite similar to that of the apparatus 20 of the first embodiment of the invention, the operation will not be repeated. It will be noted, however, that water subjected to an overriding air pressure is the preferred heating medium used in the preheater 24a when cans are being processed and is directed into the preheater through a conduit 421. This heating medium is isolated from the steam heating medium in the sterilizing housing 28a by the pressure valve 26a. It will also be particularly noted that the transfer valve 32a is not only a pressure valve which maintains toe desired processing pressure within the sterilizer 28a, but is also a pressure cooler which condenses the steam within the containers and accordingly permits the final cooling of the containers to occur at atmospheric pressure within the final cooler 42a. Since the final cooler 42a is at atmospheric pressure, it will be understood that the discharge valve 44a may be completely eliminated if desired.

A third embodiment of the invention is illustrated in FIG. 9 and discloses a cooking and cooling apparatus 20b which is identical in construction and operation to the apparatus 20a except that the preheater 24b and final cooler 42b are altered so as to agitate the contents of the containers during preheating and final cooling. Accordingly, only the parts of the apparatus 20b that are different from the apparatus 20a will be described in detail, and parts of the apparatus 20b that are equivalent to or identical to the parts of the apparatus 20 or 20a will be assigned the same numerals followed by the letter "b."

The preheater 24b comprises a cylindrical housing 430 (FIG. 9) rather than an annular housing as in the other embodiments of the invention, to which are connected the pressure feed valve 22b and pressure transfer valve 26b. The housing 430 includes pressure resisting end walls 432 having the shaft 433 of an agitating drum 434 journaled therein. The drum includes a cylindrical container supporting surface 436, preferably of stainless steel, which is connected to the shaft 433 by spokes 438. A variable speed, reversible motor 439 is connected to the shaft 433 by a chain drive 440 and is capable of driving the shaft 433 in either direction.

An outer liner 90b is fitted in the housing 430 and a reel 62b is rotatably mounted in the housing between the liner 90b and the supporting surface 436 of the agitating drum 434. As the rows of containers pass through the heating medium that is directed into the preheater 24b through a conduit 437, which medium is preferably hot water subjected to an overriding air pressure but may be steam or a steam-air mixture, the drum 434 is driven in either direction relative to the direction of movement of the reel 62b thereby rotating the rows of containers about their longitudinal axes during their travel along the upper half of the preheater 24b. Rapid agitation of the containers will permit higher temperatures in the preheater since the rate of heat transfer through the contents of the containers is improved greatly by agitation.

The preheated rows of containers are then advanced by the pressure transfer valve 26b into the sterilizer 28b where the contents are sterilized. The sterilized containers are 28b advanced through the pressure transfer valve 32b where the contents of the containers are flash cooled to a point where the condensible gasses in the head space of each container is condensed by cooling water from the conduit system 390b, thus reducing the pressure within the containers and permitting the containers to be discharged into the final cooler 42b at atmospheric pressure.

The final cooler 42b is an agitating cooler and is disposed within the sterilizer 28b. The final cooler 42b comprises a cylindrical housing 441 including pressure resisting end walls 442 having a shaft 443 of an agitating drum 444 journaled therein. The drum 444 includes a cylindrical container supporting surface 446, that is preferably of stainless steel, which is connected to the shaft 443 by spokes 448. A variable speed reversible motor 449 is connected to the shaft 443 by a chain drive 450 and is capable of driving the shaft in either direction.

An outer liner 260b is fitted in the housing 441 and a reel 262b is rotatably mounted in the housing 441 between the liner 260b and the supporting surface 446 of the agitating drum 444. As the rows of partially cooled containers pass through the coolant directed into the final cooler 42b through a conduit 451, the drum 444 may be driven in either direction relative to the direction of movement of the reel 262b to agitate the containers, or may be driven in the same direction and at the exact same speed as the reel 262b to reduce agitation to a minimum. The processed and cooled containers are then advanced into the discharge valve 44b and are discharged therefrom onto the take-away conveyor 290b.

It will be understood that the drive system for the row advancing parts of the cooking and cooling apparatus 20b is identical to that described in conjunction with the apparatus 20a. It will further be understood that a suitable frame (not shown) is provided for connecting the cooler 42b to the sterilizer 28b.

In view of the above, it will be apparent that the apparatus 20b is directed to the concept of agitating the rows of containers while the rows are in the preheater 24b thereby improving heat transfer and more rapidly raising the containers to the sterilizing temperature, and to the concept of agitating the containers while in the final cooler thereby more rapidly cooling the contents thereof to a temperature well below that of the boiling point of water at atmospheric pressure, and preferably to about 105° F.

A fourth embodiment of the cooking and cooling apparatus 20c is illustrated in FIGS. 10 to 20. The apparatus 20c features a rotary pressure feed valve 460 (FIGS. 10—13) and a rotary pressure discharge valve 462 disposed at one end of the apparatus, and each of which is adapted to accommodate groups or rows of containers which are shorter than the full cooker length rows. For example, the feed and discharge valves may handle rows which are 10 containers long whereas the cooker length rows may have 100 containers in each row.

In general, the cooking and cooling apparatus 20c comprises the feed valve 460 which feeds a series of short groups of containers onto an intermittently driven row forming feed conveyor 464 (FIGS. 10 and 11) which assembles the short groups or rows into cooker length rows. A row transfer device 466 then transfers the cooker length rows into the reel 468 of a pressure cooker 470. The reel 468 moves the cooker length rows of containers through the heat transfer medium in the cooker, which medium is preferably water subjected to an overriding air pressure. The sterilized containers are then discharged onto an intermittently driven transfer conveyor 472 which transfers the rows of containers one at a time from the cooker 470 to a position adjacent the inlet opening of a cooler 474. An elongated star wheel transfer device 476 then transfers the cooker length rows of containers into the reel 478 of the pressure cooler 474 wherein the containers are cooled by water subjected to an overriding air pressure. The cooker length rows of cooled containers are then deposited upon an intermittently driven group reforming discharge conveyor 482 which divides or reforms the cooker length rows of containers into short groups. The reformed groups of containers are then moved into the pockets of the pressure discharge valve 462 by a transfer device 484 which discharges them onto a take-away conveyor 486 for removal from the cooker.

More particularly, the pressure feed valve 460 and discharge valve 462 are much shorter than the length of the apparatus 20 and are both mounted outwardly beyond the vertical plane of adjacent ends of the cooker 470 and cooler 474. The feed valve 460 comprises a pocketed rotor 490 (FIG. 17) secured to a shaft 492 that is journaled in the end walls of a generally cylindrical housing 494. The discharge valve 462 is similarly designed and comprises a pocketed rotor 496 secured to a shaft 498 that is journaled in the end walls of a generally cylindrical housing 500. The specific structure for sealing the rotors 490 and 496 to their associated housings 494 and 500 are similar to that of the feed and discharge valves of the original embodiment of the invention, and accordingly, will not be described in detail. One end of each housing 494 and housing 500 is secured, as by bolting, to annular end plates 504 and 506 of the cooker 470 and cooler 474, respectively.

The cooker 470 (FIG. 10) comprises an annular housing 508 defined by an inner cylindrical wall 510, an outer generally cylindrical wall 512, the annular end plate 504 and an annular end plate 514 (FIG. 12) which end plates seal the opposite ends of the housings 508 in fluidtight engagement. The reel 468, which is similar to the reels in the other embodiments of the invention, is rotatably mounted between an inner liner 516 and an outer liner 518 which liners are fitted within the housing 508. The reel 468 is rotatably supported on pairs of trunnions 520 mounted on shafts 524 and 526, and the reel is driven in a counterclockwise direction by gears 528 keyed to a shaft 530. The trunnions 520 (only one being shown) and the gears 528 are sealed to the housing 508, in a manner similar to the other embodiments of the invention, by semicylindrical troughs.

The cooler 474 is quite similar to the cooker 470 and comprises an annular housing 532 defined by an inner cylindrical wall 534, an outer generally cylindrical wall 536, the annular end plate 506, which seals one end of the housing 532 and another annular end plate 537 (FIG. 14) which seals the other end of the housing 532. An outer liner 538 and inner liner 540 are fitted in the housing, and the reel 478 is journaled for rotation therein on pairs of trunnions 542 (only one being shown) which are keyed on shafts 544 journaled in the annular end plates 506 and 537. The reel 478 is driven in a clockwise direction by gears 546 keyed to a shaft 548 journaled in the end plates 506 and 537. The trunnions 542 and gears 546 are sealed to the housing 532 by troughs.

As best shown in FIG. 10, the cooker 470 and cooler 474 are spaced from each other, but in order to retain a pressure tight relationship with each other they are connected by a transfer housing 550. The transfer housing 550 extends the full length of the apparatus 20 and includes a vertical partition 552 that extends the full length of the cooker and cooler and is connected in fluidtight relationship over a container feed and discharge opening 554 in the cooker 470 by an upper wall 556, a lower wall 558, an end plate 559 (FIG. 16), and a similar end plate 559a (FIG. 12) on the other end of the apparatus. The partition 552 is also connected in fluidtight engagement to a feed and discharge opening 560 in the cooler 474 by an upper wall 562, an inclined wall 564, a lower wall 566, and the end plates 559 and 559a.

The end plate 559, which lies substantially in the plane of the annular end walls 504 and 506 of the cooker and cooler, seals one end of the transfer housing 550 as mentioned above except for an inlet opening and a discharge opening therein. An inlet tunnel 570 (FIGS. 13 and 17) communicates with and is sealed about the inlet opening in the plate 559, and also communicates with and is sealed about an elongated discharge opening 572 in the housing of the feed valve. Similarly, a discharge tunnel 574 communicates with and is sealed about the outlet opening in the plate 559, and communicates with and is sealed about an elongated inlet opening 575 in the housing of the discharge valve 462. The free ends of the tunnels 570 and 574 are sealed by plates 576 and 578 (FIG. 13), respectively.

As mentioned above, the other end of the transfer housing 550 (FIG. 14) is sealed by the plate 559a (FIGS. substantially in the plane of the annular end plates 514 and 537 of the cooker 470 and cooler 474 except for two transfer openings therein. A generally semicylindrical transfer tunnel 582 having an upper wall 582a and a lower wall 582b communicates with both transfer openings and is sealed to the plates 514, 537 and 559a as by bolting. Thus, the cooker housing 508, cooler housing 532, transfer housing 550 and the tunnels 570, 574 and 582 cooperate with the pressure feed valve 460 and pressure discharge valve 462 to provide a cooking and cooling apparatus which may be maintained under superatmospheric conditions.

The previously mentioned row forming feed conveyor 464 is sealed within the tunnel 570 and transfer housing 550. The conveyor 464 includes an endless belt 588 (FIGS. 13 and 17) that is trained around a drive pulley 590 keyed to a shaft 592 journaled in the walls of the tunnel 570, and around an idler pulley (not shown) journaled near the other end of the transfer housing 550. The upper run of the belt 588 is guided by an elongated bracket 594 adjacent the feed valve 460, and by a transfer bar 595, (FIGS. 10 and 11) in the area adjacent the inlet opening 554 of the cooker 470. The upper run of the endless belt 588 is intermittently driven toward the right (FIG. 13) a distance slightly greater than the length of each group of containers immediately after each group of containers to be processed is discharged onto the conveyor 464.

The groups of containers are guided by the elongated bracket 594 and by the elongated pusher bar 595 (FIGS. 10 and 11) of the transfer device 466 as each cooker length row of containers is being formed on the conveyor 464. The upper run of the conveyor belt 588 may be slightly angled toward the bar 595 and toward an upstanding flange of the bracket 594 in order to assure that the rows of containers will not prematurely roll off the conveyor 464. After the several, for example, ten groups of containers have been assembled to form a cooker length row of containers, one or more hydraulic cylinders 598 of the transfer device 466 is actuated to push the cooker length rows into the adjacent pockets of the reel 468 of the cooker 470. The cylinders 598 then immediately return the pusher bar 595 to its normal retracted position prior to the next intermittent movement of the conveyor 464.

After the rows of containers have passed through the cooking medium in the cooker 470, they gravitate from the pockets of the reel 468 onto the transfer conveyor 472. The transfer conveyor 472 (FIGS. 10, 14 and 15) is intermittently driven and comprises a drive sprocket 600 (FIG. 14) keyed to a vertically extending drive shaft 602 that is journaled in the housing 550 and projects downwardly therefrom, and a driven sprocket 604 keyed to a vertically extending idler shaft 606 journaled in the lower wall 528b of the tunnel 582. The sprockets 600 and 604 are received in slots in the vertical partition 552, and have an endless conveyor chain 610 trained therearound. The chain 610 is supported by elongated tracks 611 mounted on the vertical partition 552. The section of the track 611 adjacent the cooker 470 includes an upper portion which projects above the upper surface of the conveyor 472 and cooperates with a U-shaped extension 611a (FIG. 14) thereof and with the semicylindrical outer wall 618 of the tunnel 582 to guide the rows of containers from a position adjacent the cooker 470 to a position past the tunnel 582. The lower one of several blades of the star wheel transfer device 476 then guides the rows of containers into transfer position relative to the cooler 474.

As indicated in FIG. 15 the chain 610 of the conveyor 472 includes flat container supporting carriers 612 and 614. The carriers 612 have concave end portions which are disposed closely adjacent convex end portions of the carrier 614 so as to provide a substantially flat uninterrupted container supporting surface. As indicated in FIGS. 10 and 16, the container supporting surface is inclined downwardly toward the container guides to aid in retaining the rows of containers on the transfer conveyor 472 until they are positively deflected therefrom into the cooler 474 by the star wheel transfer device 476.

The star wheel transfer device 476 (FIGS. 14 and 20) comprises an elongated intermittently driven star wheel 622 having four equally spaced, radially extending blades 623, the lower blade as mentioned above serves as a container guide as well as means for intermittently transferring the rows of sterilized containers into the cooler 474. The star wheel 622 is keyed to a shaft 624 which is journaled in the end walls 559 and 559a of the transfer housing 550.

After the rows of containers have been transferred into and moved through the cooler 474 they gravitate from the pockets of the reel 478 onto the group reforming conveyor 482. The conveyor 482 (FIGS. 13 and 18) is disposed within the tunnel 574 and within the transfer housing 550, and comprises an endless belt 626 trained around a drive pulley 628 and a driven pulley (not shown). The drive pulley 628 is keyed to a shaft 630 journaled in the tunnel 574, and the driven pulley is keyed to a shaft (not shown) journaled in the other end of the housing 550. The upper run of the conveyor is supported by an elongated track 632 and may be slightly inclined toward an upstanding flange of the track to assure retention of the rows of containers thereon. The conveyor 482 is intermittently driven so that the upper run of the belt 626 will reform the cooker length rows of containers into groups of containers, for example ten containers in each group, and will move these groups to the left (FIG. 13) into position to be deflected into the rotary pressure discharge valve 462. After each group of containers has been moved into deflecting position, an elongated deflecting bar 634 (FIG. 18) that is supported by one or more hydraulic cylinders 636 of the discharge transfer device 484 pushes the group of containers in alignment with the discharge valves 462 into one of the pockets thereof and immediately returns to a retracted position to permit another group of containers to be moved into transfer position adjacent the discharge valve.

The reel 496 (FIG. 17) of the discharge valve 462 then advances the groups of sterilized and cooled containers out of the superatmospheric pressure within the apparatus 20c and onto the take-away conveyor 486 for removal from the apparatus.

The reels of the pressure cooker 470, cooler 474, rotary pressure feed valve 460 and rotary pressure discharge valve 462 are preferably continuously, rather than intermittently driven. However, it is to be understood that these units can be intermittently driven if so desired.

The above mentioned reels are driven in timed relation by a drive system 650 which includes the gear motor 652 (FIG. 17) that is connected to a main drive shaft 654 by a chain drive 656. The drive shaft 654 is driven in a counterclockwise direction, (FIG. 17) extends parallel to and outwardly beyond the feed valve 460 and discharge valve 462 of the apparatus 20c, and is journaled on bearings secured to the transfer housing 550. A bevel gear 658 is keyed to the shaft 654 and meshes with a bevel gear 660 keyed to one end of an inclined shaft 662 that is journaled in bearings bolted to the plates 559 and 504. A bevel gear 664 keyed to the other end of the shaft 662 meshes with a bevel gear 666 keyed to the cooker drive shaft 530 and drives the same in a counterclockwise direction thereby driving the cooker reel 468 in a counterclockwise direction.

The reel 478 of the cooler 474 is continuously driven in a clockwise direction (FIG. 17) by a bevel gear 668 which meshes with the gear 658 and is keyed on one end of an inclined shaft 670. The shaft 670 is journaled in bearings bolted to the platen 559 and 506 and has a bevel gear 672 keyed to its other end which meshes with a bevel gear 674 keyed to the cooler drive shaft 548 driving the same in a clockwise direction.

The reel 490 of the feed valve 460 is driven in a counterclockwise direction (FIG. 17) by a chain drive 676 which interconnects the main drive shaft 654 to the reel shaft 492. Similarly, the reel 496 of the discharge valves 462 is driven in a clockwise direction by a chain drive 678 which is trained around a sprocket 680 (FIGS. 13 and 17) on the shaft 492, a sprocket 682 on the shaft 498 of the discharge valve 462, and an idler sprocket 684 keyed to an idler shaft 686 suitably journaled on the transfer housing 550.

It will be understood that, when handling cooker length rows of 100 containers, the gear and sprocket ratios are such that the reels of the feed and discharge valves rotate at speeds which will move ten pockets of the feed reel 490 past the feed conveyor 464 while the cooker reel 468 moves one of its pockets past the conveyor 464, and will move ten pockets of the discharge reel 496 past the discharge conveyor 482 while the cooler reel 478 moves one of its pockets past the conveyor 482.

The row forming feed conveyor 464 and the group reforming discharge conveyor 482 (FIGS. 13 and 18) are intermittently driven so that their upper runs move to the right and left (FIG. 13), respectively, through a distance slightly greater than the length of one of the groups of containers each time a group of containers is fed onto the conveyor 464 and another group is discharged from the reforming conveyor 482. The conveyors 464 and 482 are driven by a motor driven one-revolution clutch power unit 690 (FIGS. 13 and 18) which is connected to the drive shaft 592 of the conveyor 464 by a chain drive 692. The shaft 592 is also connected to the drive shaft 630 of the conveyor 482 by a chain drive 694 (FIG. 19) which includes a sprocket 696 keyed to the shaft 592, a sprocket 698 keyed to the shaft 630, and a sprocket 700 journaled on an idler shaft 702.

The one-revolution power unit 690 is timed with the other components of the apparatus 20a and is activated immediately after a group of container has been discharged by the feed valve 460 onto the conveyor 464, and another group of containers has been discharged from the conveyor 482 by a cam 704, (FIG. 18) and a switch 706. The cam 704 is keyed to the shaft 492 of the feed valve 460 and includes six equally spaced lobes 708, which lobes correspond to the six pockets in the reel 490, projecting outwardly of the periphery thereof. Each lobe 708 engages the actuating element of the switch 706 to close the same and energize the one-revolution power unit 690 immediately after a group of containers to be processed has been discharged from the feed valve onto the conveyor 464, and another group of processed containers has been deflected into a pocket of the discharge valve 462 by the transfer device 484.

The hydraulic cylinder 636 of the transfer device 484 is actuated shortly before the group preforming conveyor 482 is intermittently driven, by a cam 710 that is keyed to the shaft 498 of the discharge valve 462 and has six equally spaced lobes 712 thereon corresponding to the six pockets in the reel 496 of the discharge valve. As diagrammatically illustrated in FIG. 18, a cam operated, spring return valve 714 is normally held in a cross-passage position, and while in this position directs high pressure hydraulic fluid from a conduit 716 that is connected to a hydraulic pump (not shown) through the valve 714 and through a conduit 717 into one end of the cylinders 636 to hold the bar 634 in a retracted position and causing the low pressure fluid in the other end of the cylinder to return to the pump through a conduit 718, through the associated cross-passage in the valve 714, and through a low pressure return conduit 720. When the core of the valve 714 is shifted to a parallel passage position in response to engagement by one of the lobes 712, the flow of fluid to the cylinder 636 is reversed thereby momentarily causing the transfer bar 634 to move to its extended position at which time a group of containers is pushed off the conveyor 482 into a pocket of the discharge valve 462. Immediately thereafter the valve 714 is returned to its cross-passage position and the transfer bar 634 is returned to its retracted position thereby allowing another group of processed containers to be moved into transfer position.

The transfer conveyor 472 is driven in a clockwise direction (FIG. 14) by a gear motor 726 (FIG. 20) having a clutch-brake assembly 728 of well known design integrally formed therewith thus assuring that a drive gear 730 on the output shaft 732 will abruptly start and stop upon energization and deenergization of the clutch-brake assembly 728. The drive gear 730 meshes with a driven gear 734 which is keyed to the drive shaft 602 of the transfer conveyor 472. The transfer conveyor 472 is normally moving and is only stopped momentarily to permit a cooker length row of containers to gravitate from the cooker 470 onto the conveyor 472 and another row of containers to be transferred into the cooler 474 by the star wheel transfer device 476. The gearing of the gear motor 726 is such that the conveyor 472 is driven a distance which will advance a row of containers from a position adjacent the cooker 470 to a position adjacent the cooler 480 during each energization of the clutch of the clutch-brake assembly 728.

In order to time the actuation of the conveyor 472 with the movement of the reels 468 and 478 of the cooker 470 and cooler 474, respectively, a cam 736 having five equally spaced lobes 738 on its periphery is keyed to the cooler drive shaft 548. A switch 740 which normally closes a circuit to the clutch and opens a circuit to the brake is mounted adjacent the cam and is momentarily opened each time one of the lobes 738 moves therepast thus momentarily stopping the conveyor 472 to permit transfer of containers onto and off the conveyor 472 while it is stationary.

The star wheel transfer device 476 is driven by a Geneva drive 744 (FIG. 21) which includes a Geneva gear 746 keyed to the shaft 624 and a Geneva drive gear 748 keyed to an idler shaft 750 journaled on the apparatus 20c. A sprocket 752 keyed on the shaft 750 is connected to a drive sprocket 754 keyed to the cooler drive shaft 548 by an endless chain 756 and drives the star wheel transfer device 476 through an arc of 90° in a counterclockwise direction. Each time the cooler reel 478 moves a distance equal to the width of one of its pockets. The Geneva drive 744 is timed with the transfer conveyor 472 so that it causes the star wheel transfer device to deflect a row of containers into the cooler 474 when the conveyor 472 is stationary.

Since the operation of the fourth embodiment of the invention has been described in conjunction with the description of the drive parts, it will not be repeated. Although the preferred heating and cooling medium is water subjected to an overriding air pressure and thermostatically maintained at the desired processing temperatures as fully described in connection with the first embodiment of the invention, it will be understood that steam or a steam-air mixture may be used in the cooker 470 if cans, rather than glass jars are to be processed.

From the foregoing description it will be apparent that the several embodiments of the invention each feature the use of at least one annular housing having a heat treatment medium therein, and a reel movable therethrough for slowly advancing long rows of containers through the housing. If glass jars are to be processed, the annular housings are maintained under superatmospheric pressure in order to retain the caps on the jars, and water subjected to overriding air pressure is the preferred heat transfer medium with the temperature of the water being thermostatically controlled so as to gradually raise the water to the sterilizing temperature and thereafter gradually drop the water from the sterilizing temperature to a temperature well below the boiling point of water at atmospheric pressure. One embodiment of the invention discloses the concept of placing a plurality of annular housings within each other. Another embodiment of the invention discloses the concept of providing a rotating drum within one of the housings for agitating the containers therein and thereby improving the heat transfer characteristics of the cooker. A further embodiment of the invention discloses the use of a rotary pressure feed and a rotary discharge valve in combination with row forming and reforming conveyors, which valves handle groups of containers which are shorter than the cooker length rows to be processed, and which conveyors form the short groups into cooker length rows and thereafter reform the cooker length rows into short groups.

Although the best mode contemplated for carrying out the present invention has been herein shown and described, it will be apparent that modifications and variations may be made without departing from what is regarded to be the subject matter of the invention as set forth in the appended claims.

I claim:

1. In a rotary cooking and cooling apparatus the combination of means defining a sealed elongated annular pressure housing having an elongated opening therein, a transfer housing sealed about said opening of said annular housing, intermittently driven row forming means in said transfer housing, a rotary pressure feed valve connected to said transfer housing for feeding groups of containers onto said row forming means, said row forming means being arranged to form said groups into cooker length rows of containers prior to moving the cooker length rows into position to be deflected into said annular housing, means for deflecting the cooker length rows into said annular housing, a reel rotatably mounted within said annular housing and including means defining a plurality of equally spaced pockets extending substantially the full length of the apparatus for accommodating cooker length rows of containers therein and for advancing the containers through said annular housing, means for directing a heat treatment medium under superatmospheric pressure into said annular housing, discharge means in pressure communication with said transfer housing, a rotary pressure discharge valve included in said discharge means and in pressure communication with said transfer housing for discharging the processed containers therefrom, and means for driving said reel, said rotary feed valve, said row forming means, said deflecting means, said transfer means and said rotary pressure discharge valve in timed relation.

2. An apparatus according to claim 1 wherein said discharge means also comprises an intermittently driven group reforming means in said transfer housing for receiving cooker length rows of containers from said annular housing and for reforming each row into shorter groups of containers, and means for thereafter deflecting each group of reformed containers into said rotary pressure discharge valve.

3. An apparatus according to claim 1 and additionally comprising a second annular housing having sealed ends and having a second opening communicating with said transfer housing, a second reel rotatably mounted within said second annular housing and having a plurality of equally spaced pockets extending substantially the full length of the apparatus for accommodating cooker length rows of containers therein, said heat treatment medium in said first mentioned annular housing being a sterilizing medium at superatmospheric pressure, means for directing a cooling medium under superatmospheric pressure into said second annular housing, transfer means in said transfer housing for receiving the rows of containers from said first mentioned housing and transferring them into said second reel in said second annular housing, and second drive means connected to said second reel and said transfer means for driving the same in timed relation to said first mentioned drive means.

4. An apparatus according to claim 3 wherein said transfer means comprises an endless conveyor having a first run disposed adjacent the opening in said first mentioned annular housing and a second run adjacent the opening in said second annular housing, and star wheel transfer means disposed above said second run, said second drive means including means for intermittently driving said transfer conveyor for advancing a row of containers from said first run to said second run while said star wheel transfer means is disposed in guiding relation with the row of containers moving along said second run, said intermittent drive means being effective to transfer the row of containers into said second annular housing while said transfer conveyor is stationary.

5. An apparatus according to claim 4 wherein said rotary pressure discharge valve includes a cylindrical housing which has an elongated inlet opening sealed to and communicating with said transfer housing, and additionally comprising an intermittently driven group reforming means in said transfer housing for receiving cooker length rows of processed containers from said second annular housing and for reforming each row into shorter groups of containers and for thereafter deflecting each group of containers and for thereafter deflecting each group of containers into said elongated opening of said cylindrical housing.

6. An apparatus according to claim 5 wherein each row is composed of about 100 containers and wherein said drive means are effective to move the cooker length rows of containers through the apparatus at the rate of about four rows per minute.

7. A rotary cooking and cooling apparatus comprising a first elongated annular pressure housing, a first driven reel in said first housing having elongated cooker length row accommodating pockets, means for directing a sterilizing medium under superatmospheric pressure into said first annular housing, a second elongated annular housing, a second driven reel in said second housing and having elongated cooker length row accommodating pockets, means for directing a cooling medium under superatmospheric pressure into said second annular housing, a pressure transfer housing connected in pressure communication with said first and second annular housing, a rotary feed valve connected in pressure communication with said transfer housing for directing groups of containers to be processed into said transfer housing while maintaining superatmospheric conditions within said housings, a rotary pressure discharge valve connected in pressure communication with said transfer housing for discharging groups of processed containers from said transfer housing while maintaining superatmospheric conditions within said housing, first transfer means in said transfer housing for forming groups of containers received from said feed valve into cooker length rows and deflecting the rows into the pockets of said first reel, second transfer means in said transfer housing for receiving cooker length rows of containers from said first reel and transferring the rows into the pockets of said second reel, third transfer means in said transfer housing for reforming rows of said containers received from said second reel into groups and for discharging the groups into said discharge valve, and means for driving said reels, said rotary pressure valves and said transfer means in timed relation.

8. A rotary cooking and cooling apparatus comprising means defining a first elongated annular pressure housing having a first elongated opening in a wall thereof, means defining a second elongated annular pressure housing having a second elongated opening in a wall thereof facing said first elongated opening, a transfer housing connected in fluidtight engagement to said first and said second housings and communicating with said first and second openings, a first driven reel in said first housing having a plurality of pockets for receiving cooker length rows of containers and for advancing the rows of containers through said first annular housing, a second driven reel in said second housing having a plurality of pockets therein for receiving rows of containers and for advancing the rows through said second housing, means for directing a sterilizing medium under superatmospheric pressure into said first annular housing, means for directing a cooling medium under superatmospheric pressure into said second annular housing, a driven rotary pressure feed valve for receiving groups of containers and for advancing the groups of containers into said transfer housing while maintaining a superatmospheric pressure therein, first transfer means within said transfer housing for receiving groups of containers from said feed valve for forming said groups into rows and for transferring said rows into the pockets of said first reel, second transfer means in said transfer housing for receiving the rows of containers from said first reel and for transferring the rows of containers into the pockets of said second reel, third transfer means in said transfer housing for receiving the rows of containers from said second reel, for reforming the rows into groups and for moving the groups out of said transfer housing, a driven rotary pressure discharge valve for receiving the groups of containers from said third transfer means and for discharging the groups from said transfer housing while maintaining the superatmospheric pressure therein, and means for driving said reels, said rotary pressure feed valves, and said transfer means in timed relation.

9. A rotary cooking and cooling apparatus comprising means defining a first elongated annular pressure housing having sealed ends and having an elongated transfer opening in a wall thereof, a first reel rotatably mounted within said first housing and including means defining a plurality of pockets extending substantially the full length of the apparatus for accommodating cooker length rows of containers therein and advancing the rows of containers through said first annular housing, means directing a sterilizing medium under superatmospheric pressure into said first annular housing, means defining a second elongated annular pressure housing having sealed ends and having an elongated transfer opening in a wall thereof, a second reel rotatably mounted within said second annular housing and including means defining a plurality of pockets extending substantially the full length of the apparatus for accommodating cooker length rows of containers therein and for advancing the rows of containers through said second annular housing, means directing a cooling medium under superatmospheric pressure into said second annular housing, means defining a transfer housing secured over said elongated transfer openings and to the walls of said first and second pressure housing in fluidtight relation, a rotary pressure feed valve connected to and communicating with the interior of said transfer housing for feeding groups of containers into said transfer housing while maintaining the superatmospheric pressure within said housings, an intermittently driven row forming conveyor in said transfer housing for receiving the groups of containers from one of said rotary pressure valves and for forming said groups into cooker length rows of containers, means for deflecting said cooker length rows into said first annular housing and into the pockets of said reel, transfer means in said transfer housing for receiving the rows of containers from said first reel after passing through said first mentioned housing and for transferring the rows of containers into the pockets of the second reel in said second annular housing, intermittently driven group reforming means in said transfer housing for receiving cooker length rows of processed containers from said second annular housing and for reforming each row into shorter groups of containers, a rotary pressure discharge valve connected to and communicating with the interior of said transfer housing for receiving the groups of containers from said reforming means and for discharging the groups of containers from the cooking and cooling apparatus while maintaining the superatmospheric pressure therein, second deflecting means for deflecting the groups of containers from said groups reforming means into said rotary pressure discharge means, and means for driving said reels, said rotary pressure valves, said row forming means, said deflecting means, said transfer means, said reforming means and said second deflecting means in timed relation.

10. An apparatus according to claim 9 wherein each row is composed of about 100 containers and wherein said drive means are effective to move the cooker length rows of containers through the apparatus at the rate of about four rows per minute.

PO-1050
(5/69)

UNITED STATES PATENT OFFICE
CERTIFICATE OF CORRECTION

Patent No. 3,563,161        Dated February 16, 1971

Inventor(s) Samuel A. Mencacci

It is certified that error appears in the above-identified patent and that said Letters Patent are hereby corrected as shown below:

Column 7, line 65, change "rotatable" to --rotatably--.
Column 8, line 8, change "driven" to --drives--.
Column 9, line 51, change "1400°F" to --140°F--; line 52, change "1600°F" to --160°F--.
Column 11, line 57, change "toe" to --the--.
Column 12, line 28, change "28b" to --then--.
Column 14, line 36, after "(Figs" insert --14 and 16) whi lie--.
Column 15, line 12, change "528b" to --582b--.
Column 16, line 27, change "platen" to --plates--; line 6 change "20a" to --20c--.
Column 19, lines 39-40, delete "and for thereafter deflec each group of containers".

Signed and sealed this 15th day of February 1972.

(SEAL)
Attest:

EDWARD M. FLETCHER, JR.        ROBERT GOTTSCHALK
Attesting Officer        Commissioner of Patents